(12) United States Patent
Guha et al.

(10) Patent No.: US 11,461,293 B2
(45) Date of Patent: Oct. 4, 2022

(54) PROCESSES AND SYSTEMS FOR ONBOARDING DATA FOR A DIGITAL DUPLICATE

(71) Applicant: TADA Cognitive Solutions, LLC, Peoria, IL (US)

(72) Inventors: Seshadri Guha, Peoria, IL (US); Vinay Sikka, Peoria, IL (US); Subbarao Turlapati, Peoria, IL (US)

(73) Assignee: TADA Cognitive Solutions, LLC, Peoria, IL (US)

( * ) Notice: Subject to any disclaimer, the term of this patent is extended or adjusted under 35 U.S.C. 154(b) by 219 days.

(21) Appl. No.: 16/544,701

(22) Filed: Aug. 19, 2019

(65) Prior Publication Data
US 2021/0056084 A1 Feb. 25, 2021

(51) Int. Cl.
*G06F 16/00* (2019.01)
*G06F 16/21* (2019.01)
*G06F 16/25* (2019.01)
*G06F 16/215* (2019.01)

(52) U.S. Cl.
CPC ......... *G06F 16/213* (2019.01); *G06F 16/212* (2019.01); *G06F 16/215* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 8,332,526 B2 | 12/2012 | Kruse et al. | |
| 8,849,860 B2* | 9/2014 | Ilyas | G06N 7/005 707/791 |
| 9,038,082 B2 | 5/2015 | Maes | |
| 9,909,160 B2* | 3/2018 | Lindquist | C12Q 1/6883 |
| 10,002,325 B2* | 6/2018 | Sweeney | G06F 16/84 |
| 10,050,842 B2* | 8/2018 | Salam | H04L 41/16 |
| 2006/0248045 A1* | 11/2006 | Toledano | H04L 63/0272 |
| 2008/0294299 A1* | 11/2008 | Amsterdam | H04N 13/275 700/303 |

(Continued)

OTHER PUBLICATIONS

Tada Beyond data, "Building with TADA—Tada Cognitive Solutions", https://tada.zendesk.com/hc/en-us/categories/360000658454-Building-with-Tada, retrieved from the Internet Oct. 30, 2020, 4 pages.

(Continued)

*Primary Examiner* — Jean M Corrielus
(74) *Attorney, Agent, or Firm* — Lee Sullivan Shea & Smith LLP

(57) ABSTRACT

Disclosed herein is a process that involves retrieving a data model for a data source, establishing at least one filter operation or at least one clean operation that modifies an aspect of the retrieved data model, onboarding underlying data from the data source while applying the established at least one filter operation or at least one clean operation, defining at least one transformation operation to apply to a portion of the underlying data that has been onboarded, and applying the at least one transformation operation to the portion of the underlying data to thereby assign the data to a semantic network, the semantic network comprising conceptual data components and associative data components.

20 Claims, 8 Drawing Sheets

(56) References Cited

U.S. PATENT DOCUMENTS

| | | | |
|---|---|---|---|
| 2009/0157419 A1* | 6/2009 | Bursey | G06F 16/254 |
| | | | 705/346 |
| 2010/0287158 A1* | 11/2010 | Toledano | H04L 63/0272 |
| | | | 707/718 |
| 2016/0028802 A1* | 1/2016 | Balasingh | H04L 43/065 |
| | | | 709/224 |
| 2016/0028808 A1 | 1/2016 | Arthursson et al. | |
| 2017/0060972 A1* | 3/2017 | McHugh | G06F 16/258 |
| 2017/0069009 A1* | 3/2017 | Bursey | G06F 16/29 |
| 2017/0300839 A1* | 10/2017 | Bursey | H04L 63/0245 |
| 2018/0173795 A1* | 6/2018 | Cobbett | G06F 16/316 |

OTHER PUBLICATIONS

Tada Beyond data, "Getting Started—Tada Cognitive Solutions", https://tada.zendesk.com/hc/en-us/categories/360000306154-Getting-Started, retrieved from the Internet Oct. 30, 2020, 20 pages.

Tada Beyond data, "The Tada App—Tada Cognitive Solutions", https://tada.zendesk.com/hc/en-us/categories/360001618714-The-Tada-App, retrieved from the Internet Oct. 30, 2020, 60 pages.

"Introduction to TADA—Tada Cognitive Solutions", https://vimeo.com/21082865, Uploaded Thursday, Mar. 30, 2017 at 3:38 PM EST via Parallel Uploader.

"Hello, we're TADA!—Tada Cognitive Solutions", https://vimeo.com/237788154, Uploaded circa 2017.

"Tada Suite Tutorial—Tada Cognitive Solutions", https://www.youtube.com/watch?v=_xQp-j3Rbog, Uploaded Jan. 21, 2020.

International Searching Authority, International Search Report and Written Opinion, PCT/US2020/035104, dated Aug. 27, 2020, 7 pages.

\* cited by examiner

PROCESSES AND SYSTEMS FOR ONBOARDING DATA FOR A DIGITAL DUPLICATE

CROSS-REFERENCE TO RELATED APPLICATION

The contents of commonly-owned U.S. application Ser. No. 16/425,886, filed on May 29, 2019 and titled "Digital Duplicate" are hereby incorporated by reference herein for all purposes.

BACKGROUND

Businesses and other networks have a fundamental need to derive an understanding of their business/network at any moment in time, in order to engage in strategic & operational decision-making.

Overview

Today, this need to understand your business is served by a range of conventional systems for storing, manipulating, and accessing data. Such systems are generally limited in their scope, flexibility, and ability to integrate with other such systems that exist within a business or across multiple businesses.

Part of this limitation arises from these conventional systems for storing, manipulating, and accessing data being built around specific business functions. As examples, such systems may include a CRM tool, inventory management system, accounting system, enterprise resource planning, payroll tool, among other examples. These systems further suffer from being confined to engaging in specific user functions (e.g., report generation and visualization, data input, etc.) that are associated with those business functions.

Further, "data warehousing" and "business intelligence" systems tend to consume data originating from various sources in a data network, and aggregate and pre-process that data to fit a predefined schema or set of dimensions. As a tool, data warehousing is rigid by virtue of the fact that the dimensions, metrics, aggregation, and delivery models (e.g., dashboards) for the data must be pre-defined prior to utilization. In addition, the data contained within such systems may also be used for the specialized simulation and modeling of specific (narrow) areas of the business (e.g., supply chain modeling, manufacturing planning, financial modeling & forecasting, etc.).

Conventional systems—such as relational databases—are advantageous for vertical scaling (e.g., expanding a data table of 22 columns to billions of records), but tend to be rather limited in terms of horizontal linking and expansion across multiple tables.

In order to address these shortcomings, and to help improve upon these and other problems, the present disclosure seeks to reduce fixed relationships between data tables through the disclosed digital duplicate data structure, which utilizes a dynamic model and method that can be implemented through a plurality of techniques including dynamic entity relationships. This allows for the digital duplicate to ingest information, access data, and adapt to an organization's changes without the burden of redesigning the data system from the ground up, as may be required in conventional data structures and conventional approaches for implementing data storage systems and data structures.

From a user standpoint, conventional data structures and conventional approaches for implementing data storage systems may allow for data to be accessed in response to specific queries as permitted by the foundational design of database structures (e.g., based on requirements analysis and design, as used to design a relational database system). One drawback to this approach, however, is that in order to obtain a desired output from the data storage system (e.g., to obtain a desired query result), the user must have a priori knowledge of the architecture of the data storage system, including an understanding of the data structures utilized in the data storage system. With the approach disclosed herein, there are no such constraints. Indeed, the digital duplicate may replicate the real-world physical reality of the existence of associations between digital records (data) describing physical assets, events and other phenomena, and as such may be configured to provide to users desired outputs without requiring those users to have a priori knowledge of the data storage architecture.

In some respects, the disclosed approaches for establishing new data structures provide other advantages and efficiencies. As one example, relationships in the new data structures can be established using minimal additional logic. Further, data ingestion occurring from multiple data sources can, with the benefit of the present approach for establishing new data structures, result in data that is efficiently synthesized and arranged in the established data structure, helping to ensure it is consistent across an organization's entire data store. Additionally, once relationships between data are established, changes in any underlying data source (e.g., changes to the underlying data models or structure used by the data source) do not require changing the established relationships.

In one aspect, disclosed herein is a computer-implemented method that involves: retrieving a data model for a data source, establishing at least one filter operation or at least one clean operation that modifies an aspect of the retrieved data model, onboarding underlying data from the data source while applying the established at least one filter operation or at least one clean operation, defining at least one transformation operation to apply to a portion of the underlying data that has been onboarded, and applying the at least one transformation operation to the portion of the underlying data to thereby assign the data to a semantic network, the semantic network comprising conceptual data components and associative data components.

In another aspect, disclosed herein is a computing system that comprises at least one processor, a non-transitory computer-readable medium, and program instructions stored on the non-transitory computer-readable medium that are executable by the at least one processor to cause the computing system to carry out the operations disclosed herein, including but not limited to the operations of the foregoing method.

In yet another aspect, disclosed herein is a non-transitory computer-readable medium comprising program instructions that are executable to cause a computing system to carry out the operations disclosed herein, including but not limited to the operations of the foregoing method.

One of ordinary skill in the art will appreciate these as well as numerous other aspects in reading the following disclosure.

DETAILED DESCRIPTION

The following disclosure references the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

The present disclosure is generally directed to technology to build a "digital duplicate" representing an organization's business operations that offers a unique set of advantages over conventional systems. Specifically, by building a digital duplicate using a new data structure based on the neurosynaptic model through which humans combine and use information in the brain, the digital duplicate may facilitate a more efficient and dynamic means of storing, retrieving, searching, securing, navigating, and synthesizing the data associated with the business or other network.

When the digital duplicate is populated with the data (embodied as digital content), the digital duplicate may allow for the data to be contextualized in a way that benefits from the efficiencies realized by human cognition. Furthermore, the data may originate from a plurality of sources (e.g., conventional data stores or warehouses) and may be unified and/or aggregated from those distributed sources into the context provided by the digital duplicate.

The disclosed system may be built in network-form, making large-scale multidimensional nodes, associations, and properties of many different data sources and types lightweight in comparison with conventional systems. Notably, conventional systems, such as the semantic web, do not provide for associations to be formed automatically based on semantic alignment between two or more pieces of data. As disclosed, the present architecture employs a semantic data type, among other properties and property types, which allows for associations to be formed between different data from their shared semantic context, automatically, without the association having to be programmed into the system (as it may otherwise be in existing systems, such as those that utilize "triplet" form, like OWL, RDF, etc.). Accordingly, the present disclosure provides a technique that invention allows for rules, logic and associations to be established and utilized around stored data without the need for programmatic logic.

In addition, the introduction of the semantic data type allows for semantically-identical information to be correlated even when different language is used by different users across a network or networks to describe that same information. This ability to correlate information by its semantics enables a wealth of novel functionality relating to data consumption, processing, association, manipulation and use, among others.

I. Example System Architecture

Figure 1A:
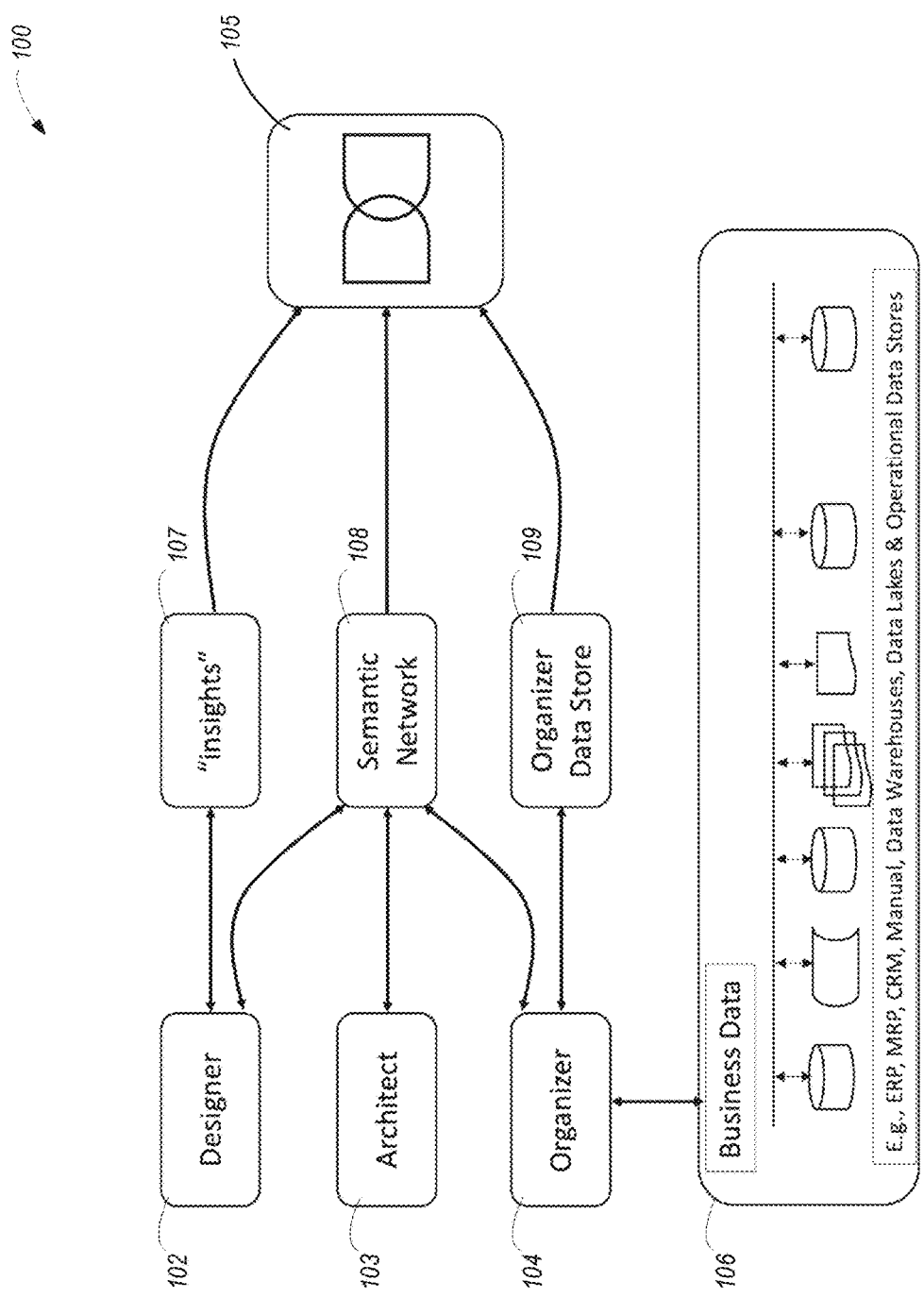
FIG. 1A depicts an example high-level functional arrangement in which example embodiments may be implemented.

Turning now to the figures, FIG. 1A depicts a high-level arrangement 100 of some of the functional components that may be involved in establishing and navigating through various aspects of a digital duplicate. In one example, three different tools may be used to establish and navigate through various parts of a digital duplicate 105, namely a designer tool 102, an architect tool 103, and an organizer tool 104, among other possible tools. At a high level, the architect tool 103 may be used to establish what is referred to herein as a "digital context," which can be thought of as the framework that replicates the language of a business. More particularly, but still by way of example, the architect tool 103 may be used to establish a "semantic network" 108 that relates the terminology and conceptual meanings behind the data collected and stored by an organization, such as various terms, metrics, key performance indicators, etc. that will be used within the digital replica of the business. As will be described further herein, the semantic network 108 may be a dynamic network of various data structures that are linked together, which replaces the typical relational data model of rows and columns contained within disparate databases, which provides cross-functional visibility. A semantic network 108 may comprise nodes, links, and properties that represent core-business elements, and is the foundation of the digital context.

A designer tool 102 may be used to introduce business logic into the semantic network by creating "insights" 107 that traverse the network through one or more "pathways." The insights 107 may then be used as a basis for information and visualizations provided to end users in one or more forms. The insights 107 may be created at the semantic level, and may thus be abstracted away from underlying source data 106.

An organizer tool 104 may be used to make a connection between the semantic network 108 and the organization's underlying data stores 106 (which, as depicted, may span across multiple disparate traditional databases or other data warehouses). This functionality may, in some embodiments, include functionality to link multiple data sources to the semantic network 108, as well as onboard the underlying data from the organization's underlying data stores 106 to the organizer data store 109 and ultimately into the semantic network 108 after filtering, cleaning, transforming, and/or validating the data as desired. These actions may serve to provide the system with what is referred to as "digital content," which together with the "digital context" form what is referred to as a "digital duplicate." The functionality that may be embodied in an organizer tool is described further herein. In some examples, the organizer tool is embodied as a software tool and is configured to be executed by the example system architecture described further herein below.

Figure 1B:
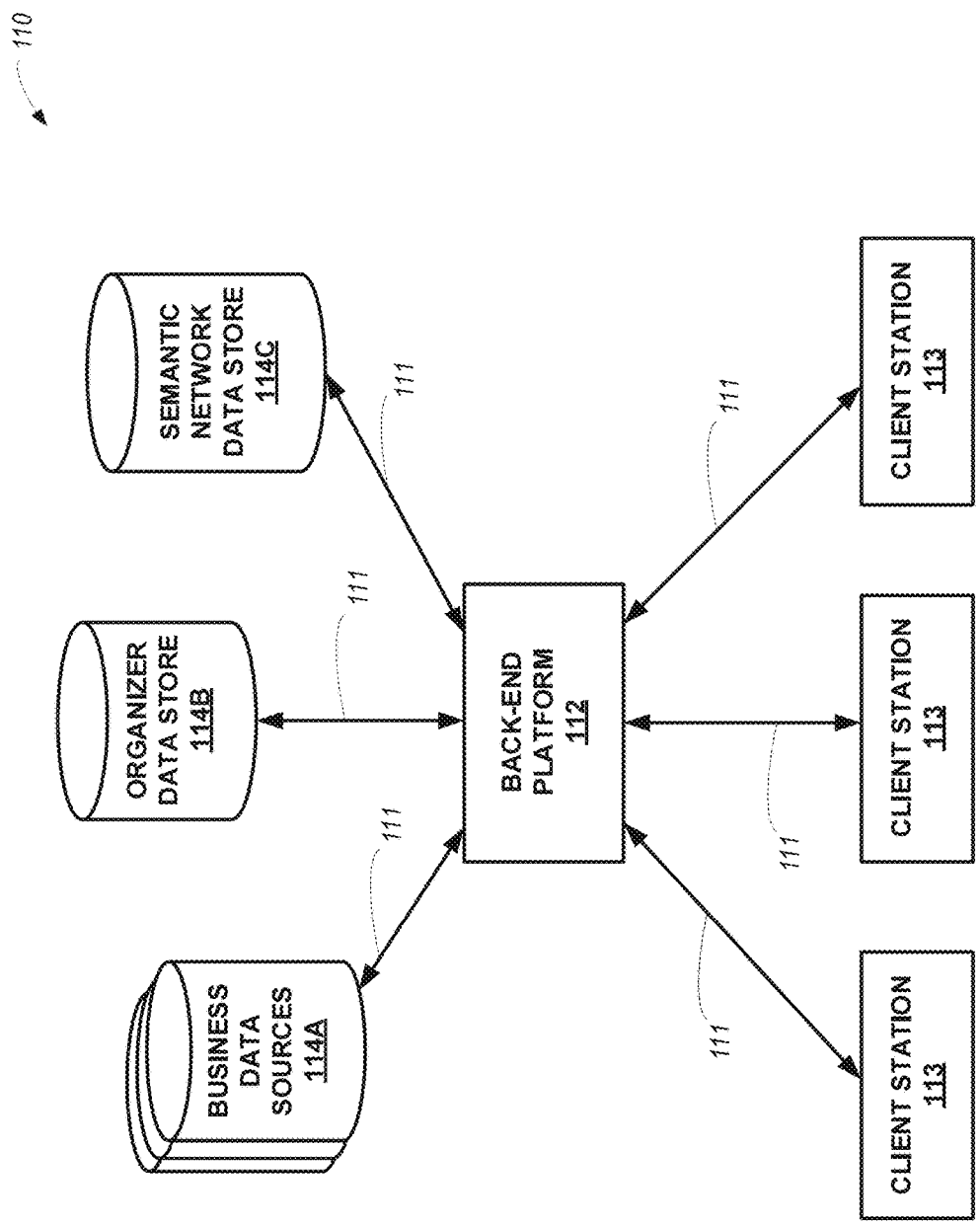
FIG. 1B depicts an example network architecture in which example embodiments may be implemented.

Turning now to FIG. 1B, depicted herein is an example network configuration 110 in which example embodiments of the present disclosure may be implemented. As shown in FIG. 1B, network configuration 110 includes a back-end platform 112 that may be communicatively coupled to one or more client stations, depicted here, for the sake of discussion, as client stations 113.

Broadly speaking, back-end platform 112 may comprise one or more computing systems that have been provisioned with software for carrying out one or more of the functions disclosed herein, including but not limited to establishing a digital context and ingesting data to form a digital duplicate. The one or more computing systems of back-end platform 112 may take various forms and be arranged in various manners.

For instance, as one possibility, back-end platform 112 may comprise a computing infrastructure of a public, private, and/or hybrid cloud (e.g., computing and/or storage clusters) that has been provisioned with software for carrying out one or more of the functions disclosed herein. In this respect, an entity that owns and operates back-end platform 112 may either supply its own cloud infrastructure or may obtain the cloud infrastructure from a third-party provider of "on demand" computing resources, such as Amazon Web Services (AWS) or the like. As another possibility, back-end platform 112 may comprise one or more dedicated servers that have been provisioned with software for carrying out one or more of the functions disclosed herein. Other implementations of back-end platform 112 are possible as well.

In turn, client stations 113 may each be any computing device that is capable of running the front-end software disclosed herein. In this respect, client stations 113 may each include hardware components such as a processor, data storage, a user interface, and a network interface, among others, as well as software components that facilitate the client station's ability to run the front-end software disclosed herein (e.g., operating system software, web browser software, etc.). As representative examples, client stations 113 may each take the form of a desktop computer, a laptop, a netbook, a tablet, a smartphone, and/or a personal digital assistant (PDA), among other possibilities.

As further depicted in FIG. 1B, back-end platform 112 is configured to interact with client stations 113 over respective communication paths 111. In this respect, each communication path 111 between back-end platform 112 and one of client stations 113 may generally comprise one or more communication networks and/or communications links, which may take any of various forms. For instance, each respective communication path 111 with back-end platform 112 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 111 with back-end platform 112 may be wireless, wired, or some combination thereof, and may carry data according to any of various different communication protocols. Although not shown, the respective communication paths 111 between client stations 113 and back-end platform 112 may also include one or more intermediate systems. For example, it is possible that back-end platform 112 may communicate with a given client station 113 via one or more intermediary systems, such as a host server (not shown). Many other configurations are also possible.

The interaction between client stations 113 and back-end platform 112 may take various forms. As one possibility, client stations 113 may send certain user input related to a digital duplicate to back-end platform 112, which may in turn trigger back-end platform 112 to take one or more actions based on the user input. As another possibility, client stations 113 may send a request to back-end platform 112 for certain data and/or a certain front-end software module, and client stations 113 may then receive digital duplicate data (and perhaps related instructions) from back-end platform 112 in response to such a request. As yet another possibility, back-end platform 112 may be configured to "push" certain types of digital duplicate data to client stations 113, in which case client stations 113 may receive digital duplicate data (and perhaps related instructions) from back-end platform 112 in this manner. As still another possibility, back-end platform 112 may be configured to make certain types of digital duplicate data available via an API, a service, or the like, in which case client stations 113 may receive data from back-end platform 112 by accessing such an API or subscribing to such a service. The interaction between client stations 113 and back-end platform 112 may take various other forms as well.

As also shown in FIG. 1B, back-end platform 112 may also be configured to communicate with one or more data sources 114A-C, such as external databases, internal databases, and/or another back-end platform or platforms. Such data sources—and the data output by such data sources—may take various forms. Further, back-end platform 112 and the one or more external data sources 114 may be configured to interact over a communication path 111, which may take the form or forms discussed above with respect to the other communication paths 111.

It should be understood that network configuration 110 is one example of a network configuration in which embodiments described herein may be implemented. Numerous other arrangements are possible and contemplated herein. For instance, other network configurations may include additional components not pictured and/or more or less of the pictured components.

II. Example Computing Device

Figure 2:
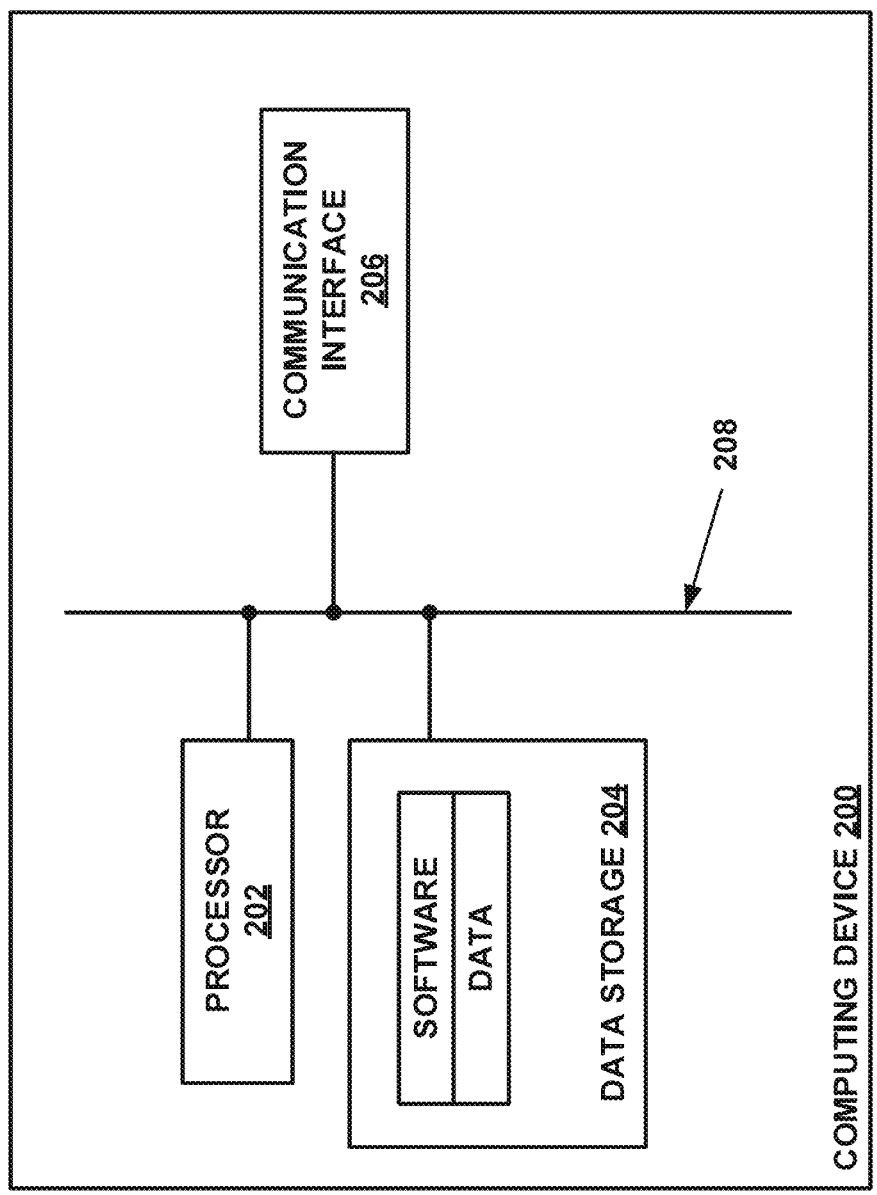
FIG. 2 depicts a simplified block diagram of an example computing device in which example embodiments may be implemented.

FIG. 2 is a simplified block diagram illustrating some structural components that may be included in an example computing device 200, which could serve as, for instance, the back-end platform 112 and/or one or more of client stations 113 in FIG. 1B. In line with the discussion above, computing device 200 may generally include at least a processor 202, data storage 204, and a communication interface 206, all of which may be communicatively linked by a communication link 208 that may take the form of a system bus or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an opticalstorage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the computing device 200 to carry out the operations disclosed herein. These software components may generally take the form of program instructions that are executable by the processor 202 to carry out the disclosed functions, which may be arranged together into software applications, virtual machines, software development kits, toolsets, or the like, all of which are referred to herein as a software tool or software tools. Further, data storage 204 may be arranged to store data in one or more databases, file systems, or the like. Data storage 204 may take other forms and/or store data in other manners as well.

Communication interface 206 may be configured to facilitate wireless and/or wired communication with other computing devices or systems, such as one or more client stations 113 when computing device 200 serves as back-end platform 112, or as back-end platform 112 when computing device 200 serves as one of client stations 113. As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, computing device 200 may additionally include one or more other interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with computing device 200.

It should be understood that computing device 200 is one example of a computing device that may be used with the embodiments described herein. Numerous other arrangements are possible and contemplated herein. For instance, other computing devices may include additional components not pictured and/or more or fewer of the pictured components.

III. Digital Duplicate Data Structures

As mentioned, the present disclosure is directed to a new approach for structuring an organization's, a business's, or a network's data as well as processes for onboarding this data into the disclosed platform, all of which may help to facilitate more efficient access to this data. At a high level, this approach involves establishing a digital context and populating the digital context with digital content to thereby form what is referred to herein as a digital duplicate. Deploying a digital duplicate in practice includes the high-level steps of first creating the digital context, and second adding data to this digital context. The digital duplicate may be kept live or refreshed repeatedly over time by continuously updating the digital context as the organization's, business's, or network's data changes and the digital content as the data and the data sources change. While elements of the digital context and digital content may change, the core data structure of the digital duplicate does not typically change, allowing the information flow to remain consistent without having to change the design of the data structure.

Figure 3:
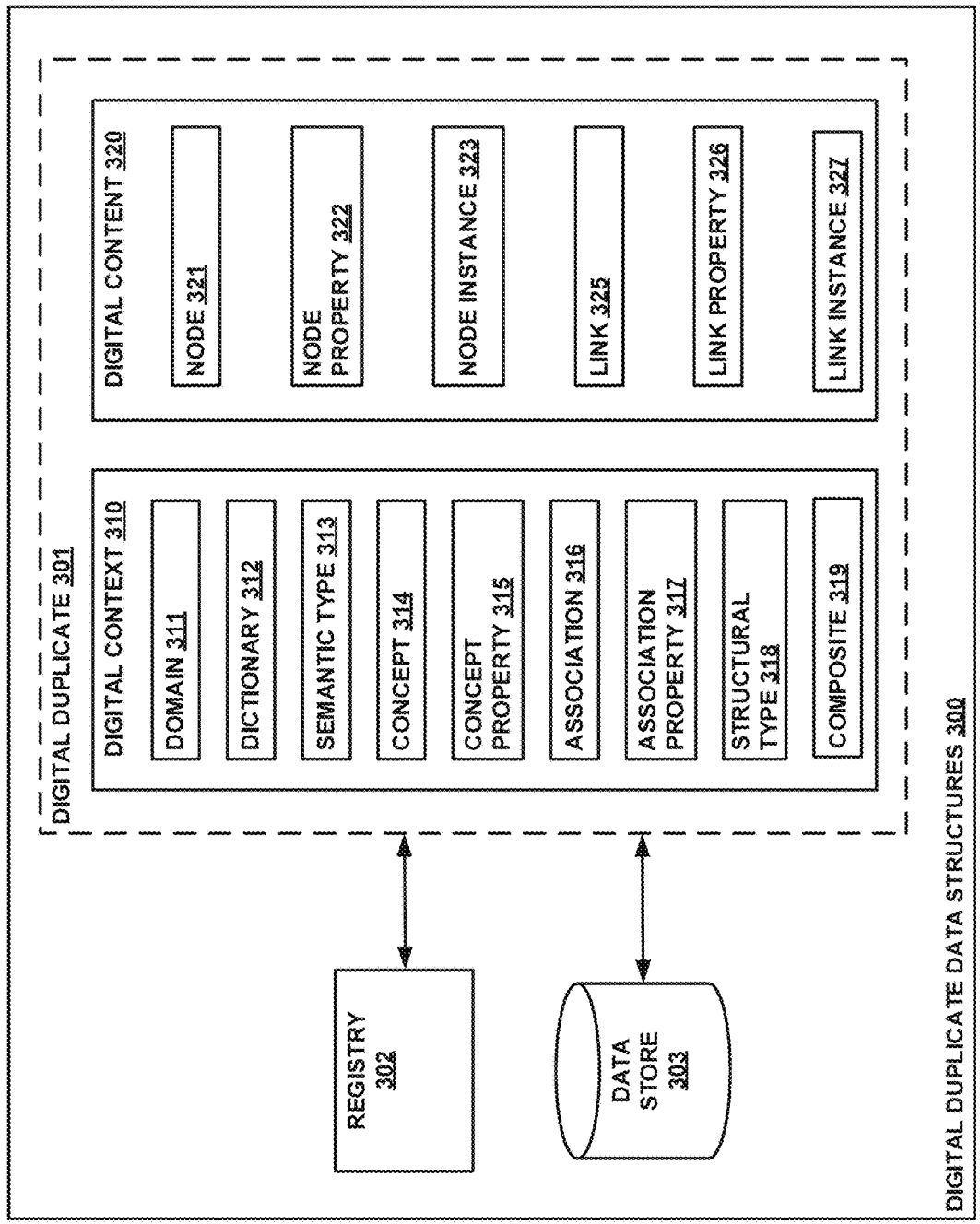
FIG. 3 depicts a simplified block diagram of some example data structures according to example embodiments.

FIG. 3 is a simplified block diagram, illustrating an example digital duplicate data structure architecture 300 according to an example embodiment of the present disclosure. At a high level, and as depicted, digital duplicate data structures 300 may include a digital context 310 and digital content 320, which together form what is referred to herein as an instance of a digital duplicate 301. The data structures 300 also include a registry 302 and a data store 303. These various data structures are described herein in further detail.

A. Digital Context

At a more specific level, but still by way of example, FIG. 3 depicts an example architecture diagram illustrating certain data structures included within digital context 310. As mentioned, digital context 310 is a data structure that generally comprises a network of individual data components. This network of data components may include structural context components and semantic context components. These components may be stored in data store as will be described further herein.

Turning first to the structural context components, these structural context components may generally describe how the data is structured and stored in the digital context. In one implementation, the structural context components may include conceptual components 314 (sometimes referred to herein as concepts) and associative components 316 (sometimes referred to herein as associations). And these components may have one or more respective properties 315, 317. These components may be designed to hold data that describes various aspects about how an organization's information is structured within the digital duplicate 301 as well as how this information relates to itself. Although these components are depicted as blocks in a simplified block diagram, it should be understood that the underlying data represented by these blocks may be stored in an appropriate storage location of data store 303, which may at time be referred to herein as a directory.

A conceptual component 314 may generally be a data structure that is designed to hold data that describes one aspect of an organization's business. To illustrate with an example for a particular organization in the medical services industry, one example conceptual component may be a "physician" component where this conceptual component may be designed to hold data that describes the physicians that are employed by the particular organization. To this end, the "physician" conceptual component may include various properties 315 for holding such data, including a "Last Name" property, a "First Name" property, a "Specialty" property, a "Telephone Number" property, and/or a "Years in Service" property, among other examples.

In some cases, properties may be shared across multiple conceptual components. For example, the "specialty" property may be shared across multiple "Physician" conceptual components and/or the "Clinic" conceptual component. In situations in which a property is widely shared across multiple conceptual components, the digital context may be configured to promote the "specialty" property from a property to a separate concept. This may be accomplished without changing the underlying data structure but rather reconfiguring it. This ability of the neuro-semantic network to adapt and learn as the organization changes makes it a scalable and learning model. The method provides for the ability to promote properties into concepts or to collapse them into concepts and associations to best represent the current structure of the organization.

Another example conceptual component 314 may be a "patient" component where this conceptual component may be designed to hold data that describes the individuals that are patients of the various physicians who are employed by the particular organization. To this end, the "patient" conceptual component may include various properties 315 for holding such data, including a "Last Name" property, a "First Name" property, a "Home Address" property, and/or a "preferred Payment Method" property, among other examples.

Yet another example conceptual component 314 may be a "clinic" component where this conceptual component may be designed to hold data that describes the various clinical facilities utilized by the particular organization. To this end, the "clinic" conceptual component may include various properties 315 for holding such data, including a "Clinic Name" property, an "Address" property, a "Services Offered" property, and/or a "Capacity" property, among other examples.

As depicted, another type of structural component of the digital context may be an associative component 316. An associative component is similar to a structural component in that it is designed to hold data that describes one aspect of an organization's business. But more specifically, the associative component is also designed to hold data that (i) describes an aspect of the organization's business such as an activity or a metric and (ii) relates together to two or more conceptual components 314. As an example, one example associative component for the particular organization in the medical services industry may be a "visit" component designed to hold data that describes a particular patient's visit to a particular physician at a particular clinic and is thus associative of multiple conceptual components, including the example "physician," "patient," and "clinic" structural components described above. To this end, the "visit" associative component may include various properties 317, including a "Date of Visit" property, a "Duration of Visit" property, "Billed Value of Visit," and/or a "Diagnosis of Visit" property, among other examples.

As mentioned throughout the examples given above, structural context components, including both conceptual components and associative components, include various properties 315, 317 for holding certain specific descriptive data for the structural context component. In some implementations, each individual property of a given structural context component may be described by a particular combination of a structural data type 318 and a semantic data type 313, which may thus form a semantic component.

Generally, a structural data type 318 applied to information is data that describes how the information is stored within the system. Many different structural data types are possible. As one example, a structural data type may take the form of a "temporal" data type, under which a "Years in Service" property may fall. As another example, a structural data type may take the form of a "spatial" data type, under which a "Clinic Address" property may fall. As another example, a structural data type may take the form of a "physical" data type, under which a "Clinic" and the "Clinic Name" property may fall. As another example, a structural data type may take the form of a "Personal" data type, under which a "Last Name" data type may fall. As another example, a structural data type may take the form of a "Quantitative" data type, under which a "Billed Value of Visit" property may fall. As another example, a structural data type may take the form of a "Categorical" data type, under which a "Specialty" property may fall. It should be appreciated that other examples may be possible as well.

Generally, a structural data type helps define how data is managed, indexed, and stored for all similar properties in the network. Properties with common structural data type may use common data structures to store and retrieve data across a digital duplicate and provide an efficient way to store, access and relate data; allowing for unique computations; and provide better methods to access, resolve and compare similar data. For example, all "temporal" data types may share or "index" to a common timeline data structure that allows independent events like a sale event and a marketing discount that happened during the same month without having to explicitly compare data. This provides an ability to not only perform unique computations and analysis on properties with similar structural data like "same month," or "same quarter," but also compare financial results of two unrelated companies for the same quarter even though they belong to different business networks because they use the same temporal data type. In another case, if two separate networks provide the population and economic data for the same spatial data type (such as a zip code), it allows one to overlay and contrast population and GDP for the same zip code with minimal effort. Multiple similar storage and advantages can be added to across all shared structural data types by creating a shared structural data type and storage model across properties in a network.

Structural data types like "temporal," "spatial," "personal," or "organizational" may allow data and methods to be shared across one or more properties in a network or across whole networks using a common data structure like a shared timeline, time resolution, or temporal methods; while semantic data types (discussed below) allows for data and methods to be shared across a network using common meaning. Shared structural data types may also have shared resolution and absolute values. For instance, "February 2015" will have a resolution of 1 day and may be a delivery date to a customer or the start date of an employee. This allows shared computations like "Start Month" or "Delivery Month" to be performed.

As also indicated, each property may also have a semantic data type 313. Generally, a semantic data type applied to underlying information is data that describes what the information means. A semantic data type may have various aspects that facilitate describing what the information means. One aspect that a semantic data type may have is called a primitive data type. A primitive data type may describe the general form of the information. Example primitive data types may include "integer," "Boolean," "string," "float," etc. Another aspect that a semantic data type may have is a pointer that points to a particular function that may be associated with the information. This pointer may be stored in the dictionary entry 312 for the particular semantic data type and may point to various kinds functionality. As one example, the pointer may point to a web method for utilizing the underlying information. A web method may be any operation or set of operations embodied in a web service, API, or the like. For instance, one web method may be a "mailto: EmailAddress" web method that refers to a web method that causes an email client to be invoked, generate a new email message, and populate the "To:" field with the email address represented by the data variable "EmailAddress." Other web methods are possible as well.

Another example of a function to which a pointer may point is mathematical operation performed using the underlying information represented by the semantic data type. For instance, one type of mathematical operation for a "date of birth" semantic data type may be an age computation function. With such a function, the system may compute the age of an individual represented by the underlying date of birth information by, for instance subtracting the "date of birth" date from "current date" data to arrive at "age" data.

Another type of mathematical function for a "price per unit" semantic data type may be a total price aggregation function. With such a function, the system may aggregate all of the data values from various "price per unit" data types to arrive a total price value. Such a function may be useful in situations where a customer is purchasing products or services in a single order that stems from two or more aspects of a business, which may not have aggregated their data systems in advance. Applying the "price per unit" semantic data type (or, in other examples, a similar-functioning semantic data type) serves to link the pricing across what may be disparate aspects of the organization and/or disparate data systems.

Another type of mathematical function for a "lead time" semantic data type may be a lead time aggregation function. A "lead time" semantic data type may be associated with a product, component of a product, subassembly, construction project, etc. With such a function, when a customer purchases multiple products at once, an aggregation function may be executed in which the system may automatically populate "lead time" data by selecting the individual lead time field for each of the purchased products that has the greatest lead time value. In cases in which a product may not have a lead time associated with it, the lead time of each subassembly or component that makes up the product may by summed to approximate the total lead time of the product.

In one example, during data ingestion, the system may capture various data fields for an order, including a "deliveryDate" field for describing the delivery date of an order, an "orderDate" field for describing the date of the placement of the order, and a "deliveryTime" field for describing the time taken for the order to be fulfilled after the product is fully manufactured and stocked in inventory, all of which may be specified by various a logistics or fulfillment systems. At this stage, the system may compute the actual lead time of the product to be the function of (deliveryDate—orderDate)—deliveryTime. Therefore, in the case where a product is not built before it is ordered (as is common in the heavy equipment industry, for example) lead time may be a residual value, as calculated above. Once lead time is known, the system may then engage in a function that compares the actual lead time with the approximated lead time, which may be made possible by the existence the "lead time" semantic data type being used across multiple business systems that is semantically distinct from a "delivery time" type. A further function may add an "error" to the function for computation of approximated lead times for all other products, which in turn may propagate the new calculation of approximated lead times throughout the digital duplicate instantaneously. In this way, the system may engage in a kind of machine learning.

Another example of a function to which a pointer may point is a linking function that may operate to link two or more semantic data types together and form a new property of an associative structural component. As one example of this, a distance function may link together an "address" property of a "patient" conceptual component and an "address" property of a "clinic" conceptual component and computes the distance between these two addresses. The function may then save this distance as a new property of a new associative component.

Yet another example of a function to which a pointer may point is a semantic search function. With such a function, a search may be executed on a given semantic data type, which may retrieve data of the same semantic type from other areas of the organization or other network.

To help illustrate, consider an example in which respective digital duplicates have been established for different aspects of an organization. Each such digital duplicate will have its own set of data components stored separately from the data components of the other digital duplicates. In a situation in which a user desires to know all employees that share duties or interact across the organization's departments, a semantic query can be issued on an "Employee" semantic data type. In the context of the present disclosure, such a semantic search may return all data objects that are based on this semantic type, regardless of the content, format, or location of the data. In this way, the semantic search unifies various disconnected digital representations. With conventional approaches, by contrast, a typical search would fail here, because the data may be spread out across multiple different databases and arranged in multiple tables; and as such, any query would need to account for these multiple databases and the various tables.

Considering another example, say a user desires to know all entities (e.g., dealers, customers, vendors, employees, etc.) having a specific area code. In the context of the present disclosure, the user could issue a single query on a "Phone No." data type for the specific area code of interest. Such a query would return all data objects having the specific area code of interest no matter the location or format of the data. By contrast, with a conventional approach, a user may need a deep understanding of the organization's data storage structure in order to carry out this query. For instance, the user may need to know what table the employee records are stored in and what field and what format the phone number data is stored in. Likewise, the user may need to know this same information for the dealer records, the customer records, the vendor records, etc. Each additional storage location may add complexity to the query. And to the extent that the data is stored in disparate data stores (such as one data warehouse for employee records and another data warehouse for vendor records), then the user may need to issue separate queries for each such disparate data source further compounding the complexity and vulnerability for user error. Thus, with the benefit of the present disclosure, it should be understood how the semantic data type provides for more efficient data retrieval, among other advantages.

In some embodiments, user interface elements presented by one or more computing devices disclosed herein (e.g., client stations 113) may reflect semantic data types with specific graphical elements, such as icons. As one example, on a user interface that is displaying multiple semantic data types for an organization, the user interface may display a telephone icon adjacent to data that is of a "phone number" semantic data type, and/or a map icon if the data is of an "address" semantic data type, although other examples are possible. It should be understood that the functions disclosed herein are merely examples, and that in other implementations, other functions may be possible as well.

Depending on the organization, semantic data types can be arranged into various semantic groups. A semantic group is generally a set of one or more semantic data types that are relevant to a particular categorical aspect of the organization. For instance, example semantic groups for an organization may be "Financial & Accounting," "Production & Manufacturing," "Purchasing," and/or "Logistics." In this way, an organization may arrange the semantic data types into groups that are reflective of the organization's operating departments or sectors. Thus, the "Financial & Accounting," semantic group may have semantic data types that refer to aspects of the organization's own financial & accounting department, the "Production & Manufacturing," semantic group may have semantic data types that refer to the aspects of the organization's own production and manufacturing operations, etc. As such, these semantic data types may more accurately describe the organization's own business operations and may thus be more useful to the organization.

Semantic data types may provide various advantages to organizations who utilize the digital duplicate schema set forth in FIG. 3 and generally described herein. As one advantage, the semantic data type 313 may serve to discriminate between (i) human language used to describe an aspect of the organization's operations (which can be stored as the name of a property, in one embodiment) and (ii) the underlying meaning of the human language used to describe the aspect of the organization's operations (which can be stored as the semantic data type, in one embodiment). This discrimination may thus allow for properties in the digital duplicate to be unified by their underlying meaning (i.e., unified by their semantic data type) even when the human language used to describe them (i.e., their property names) may not be the same.

More particularly, but still by way of example, the digital duplicate architecture 300 encourages this unification by having data sets that are consistently accurate and complete because no data is mismatched within a given context. To illustrate, if one property is called "Digits," and another property is called "Phone No." but these properties refer to the same thing, they both may be pulled into a report, a visualization, a computation, or used in some other way by the computing system when the digital duplicate calls for the semantic data type 'Telephone Number' within a given context. This may be accomplished through an arrangement where "Telephone Number" is a semantic data type that is shared by both the "Digits" and "Phone No." properties. In this way, the semantic data type may be said to "unify" two (or more) properties by these properties' underlying meanings.

Unification may also allow for functions to be associated with different properties of the same semantic data type. To illustrate, as indicated above, "Digits" and "Phone No." may be two different properties that share the same semantic data type "Telephone Number." Therefore, both "Digits" and "Phone No." may have a pointer that points to a "Make-Call" function, which is assigned to these properties by virtue of their shared semantic data type.

Unification may also occur by enriching the structural context of the digital duplicate as a result of automating through-computation of additional properties based on the semantic data type(s) of the original properties and the functions available for the semantic data type(s) (i.e., employing one or more transformations, as will be described further herein). To illustrate using the example from above, the function for computing "Age" from the "Date of Birth" semantic data type is a form of unification because "Birth Date" and "Date of Birth" may be distinct properties in the digital duplicate but share the same semantic data type: "Date of Birth." Other examples of how the digital duplicate architecture results in unification are possible as well. The combination of the concept (node) or association (link) that describes a property in combination with a semantic data type (and in many cases a structural data type) individually and combined also create a strong representation of the digital context. When combined, they provide not only a simple way to locate every piece of data in the business network, and to locate a relative position of the data to other pieces of data for navigation and comparison, but also may provide meaning to the data and structure for storage. Once combined, these data structures create ways to simply and efficiently create, manage, and navigate data in a business or network using the digital context.

As also depicted in FIG. 3, digital context 310 may contain a composite structure 319. A composite structure 319 may contain one or more indications of sets of concepts and associations that represent various aspects of an organization. One type of composite structure may be a layer of concepts and associations. The concepts and associations that comprise a layer may represent similar aspects of the organization. In one example, an organization in the medical services industry may have a "pharmaceutical" layer that comprises concepts and associations related to any pharmaceutical aspects of the organization, such as pharmacy employees, pharmacy inventories, and/or an employee layer that comprises concepts and associations related to employees across all departments. Another type of composite structure may be a realm of concepts and associations. The concepts and associations that comprise a realm may represent aspects of the organization that are grouped on a broader level. For instance, a large organization that is made up of or owns several smaller businesses may have a realm that comprises all the concepts and associations for one entire business and a realm that comprises all the concepts and associations for another entire business. Yet another type of composite structure may be an insight. The concepts and associations that comprise an insight may represent collections of concepts and insights that have been automatically identified by the system as having some threshold number of relationships. The system may identify such insights when certain patterns develop in the organization's digital context (e.g., a threshold number of associations between various concepts, and/or a threshold number of shared properties between multiple concepts or associations), and in this may be identify to users unique aspects of the organization's operations. Other examples of layers, realms, and insights are possible as are other types of composite structures.

B. Digital Content

As also depicted in FIG. 3, the digital duplicate 301 includes digital content 320. Generally, digital content 320 is the underlying data that populates one or more instances of the framework for the digital duplicate (i.e., the digital context 310) described above. Such digital content may comprise data that may be ingested into the system (in accordance with, perhaps, the functionality associated with the organizer software tool described further herein below) from one or more data sources, such as business systems (e.g. CRM systems, ERP systems, POS systems, accounting software, etc.), enterprise data stores, data warehouses, data lakes, operational data stores, as well as any other type of kind of databases or data store, such as data inputted by a user, data mined from research reports, among other examples.

This underlying data may be either static data, data updated in a batched manner, such as on a periodic or aperiodic refresh cycle, or data updated in real-time or near real-time (e.g., data provided to the system in the form of a data "stream", which may or may not be buffered to align with the update frequency of the Digital Duplicate's data ingestion method). Other examples of data ingestion may be possible as well.

As depicted, digital content may generally be comprised of links and nodes. In particular digital content 320 may include node data 321, node properties 322, and node instances 323. Further, digital content 320 may also include link data 325, link properties 326, and link instances 327.

As a general matter, node data 321 and link data 325 may include underlying instances of an organization's information that populates a digital context schema, examples of which have been described above. Node data 321 in particular may include the underlying information that populates the conceptual components of the digital context. Referring back to the examples described above, one example conceptual component may be a "physician" component where this conceptual component may be designed to hold data that describes the physicians that are employed by a particular medical services organization. Node data 321 may thus include underlying organization information for the "physician" component, such as individual instances 323 of particular physician information. Thus, for each instance of information that populates the "physician" conceptual component, node data 321 may include a corresponding node. The underlying information within each respective node may be arranged into node properties 322 in accordance with the property structure defined by the conceptual component. For instance, one "physician" node may include node property data "Smith" for the "Last Name" property of the conceptual component, "John" for the "First Name" property of the conceptual component, "Pediatrics" for the "Specialty" property of the conceptual component, "555-867-5309" for the "Telephone Number" property of the conceptual component, and "30" for the "Years in Service" property of the conceptual component, although other examples are possible.

Similarly, link data 325 may include the underlying information that populates the associative components of the digital context. Referring back to the examples described above, one example associative component may be a "visit" component where this associative component may be designed to hold data that describes a particular patient's visit to a particular physician at a particular clinic. Link data 325 may thus include underlying organization information for the "visit" component, such as individual instances 327 of particular visit information. Thus, for each instance of information that populates the "visit" associative component, link data 325 may include a corresponding link. The underlying information within each respective link may be arranged into link properties 326 in accordance with the property structure defined by the associative component. For instance, one "visit" link may include link property data "Jan. 2, 2020" for the "Visit Date" property of the associative component, "1 hour" for the "Duration of Visit" property of the associative component, and "$110" for the "Billed Value" property of the conceptual component, although other examples are possible.

C. Storage Schema

The network of individual data components described above may be stored in one or more data stores 303 in various ways. The structure of the digital context and well as the storage schema, as described herein, allows for network traversal as well as semantic searches (described above) while querying for data. As a result of traversal of the "data network," subsets of the data can be efficiently retrieved and presented to one or more users. Data stores 303 may take the form of one or more of SQL Server, Oracle, Mongo DB, or other storage technologies.

As one example of the various ways in which the individual data components may be stored in data stores 303, relationships between conceptual components 314 and associative components 316 may be stored using what are referred to as unique identifiers ("UIDs"). In this way, each element of each instance of the digital duplicate 301 may have an associated UID (which, depending on the situation, may or may not be unique). As outlined above, the various elements that may have a UID assigned thereto may be (i) domains, (ii) subdomains, (iii) directories, (iv) conceptual components, (v) associative components, (vi) properties, (vii) dictionaries, (viii) semantic groups, and/or (ix) semantic data types. In some implementation, a UID may take the form of a URI (Uniform Resource Identifier), or any other standard identifier type, among other examples.

As an illustrative example the "Patient" conceptual component may exist in data storage 303 in, for instance, table form with underlying digital data populated for the component in the form of [P1, P2, P3, etc.]. Likewise, the "Physicians" conceptual component may exist in data storage 303 in, for instance, table form with underlying digital data populated for the component in the form of [H1, H2, H3, etc.]. Likewise, the "Clinics" conceptual component may exist in data storage in table form with underlying digital data populated for the component in the form of [C1, C2, C3, etc.].

Using this arrangement, the "Visits" associative component may accordingly exist in data storage 303 in, for instance, table form with underlying digital data populated for the associative component in the form of a table containing intersecting data from the other related conceptual components. As an example, one specific instance of the "Visit" component may have data that takes the form [P1, H3, C2], where this instance describes a visit that took place by patient "P1" who was treated by physician "H3" at clinic "C3," although other combinations are be possible.

Reciprocal data tables may be stored in data storage 303 as well. A reciprocal table may serve to identify, for the conceptual component data, whether and to what extent there is associative component data that relates in some way to the conceptual component data. Using the examples set forth above, the "Patient" conceptual component discussed above may contain a reciprocal table that intersects its dependent structural components for each instance of a "Patient," where one instance for Patient "P1" may take the form of [V1, H3, C2]. Other examples of reciprocal tables may be possible as well.

In this way, the data defining the schema for the digital duplicate may be embodied as a "data network" or form of neurosynaptic storage of information, where associative information (such as that described above) is stored at the intersection point of the structural components. Each instance of such data tables for corresponding "Visits," "Patients," "Physicians," and "Clinics" (as examples) may be created from source data by an organizer part of the data ingestion method, described below. This provides certain advantages over traditional data storage models, such as relational models that use fixed relationships between data. As one advantage, the present technique uses a single, atomic template to implement each structural association and its corresponding components in the appropriate storage model. As such, this technique allows for dynamic expansion to create as many associations as may be desired to represent the desired comprehensive network. In comparison to NoSQL databases that store entities as collection of key-value pairs and allow for each record to have a variable structure in each table, or graph databases that use key-value pairs to store relationships between two values, the digital duplicate architecture allows information to be stored within a flexible neurosynaptic data structure to describe the data using the directory, dictionary, and the structural data types.

This provides dramatic flexibility both to store and locate data accurately and to capture additional business information within the network.

Further, the data defining the schema for the digital duplicate can be stored in data storage 303 via tables that represent all relationships that comprise the network of components (referred to herein as the "Digital Context" 301). And in this way, data ingested can be placed within this digital context 301. In some implementations, this technique may provide for traceability between data sources and its corresponding data context using UIDs for each source of data and for each contextual element. As an example of this, a patient's "First Name" data element may reference the UID of the structural elements corresponding to this data element (for example, the patient's associated visits) and vice-versa.

The system may be further configured to store a particular digital context 310 and/or the underlying digital content 320 for the particular digital context with an indication that the particular digital context and/or the underlying digital content belongs to unique domain 311 or subdomain. For instance, a unique domain (and/or subdomain) may be established for each instance of the digital duplicate and may be stored in a registry 302. A registry 302 may contain (a) a list of domains and (b) a list of all subdomains that exist within each domain. For instance, returning to the example organization in the medical services industry, the list of domains may contain a domain indicator (e.g., a URI) that is specific to this organization. The domain indicator may thus represent all the data that is stored as the digital content for a digital duplicate related to this organization. Within each domain, there may be one or more subdomains for individual data contexts for the organization. For instance, within the domain for the example organization, in the medical services industry, there may be a subdomain for "Purchasing," and a subdomain for "Marketing," among other examples. This, the list of subdomains may contain subdomain indicators (e.g., URIs) that identify these subdomains.

A registry 302 may also contain data describing locations and identifiers of authentication security services for users accessing data within a given domain. For instance, domains and subdomains may be private (accessible only to users within an organization), and as such may contain such authentication data that serves to describes the various user that have appropriate permissions to access the given domains and/or subdomains. Domains and subdomains may also be public, and therefore accessible to any users or systems outside of an organization. Other examples of data that may be stored in the registry are possible as well.

As explained, the schema for one instance of a digital context may be stored in or with what is referred to as a "dictionary" 312. In this way, a single dictionary 312 may store data that describes the digital context 310 for one specific organization. The system may thus store multiple dictionaries, with one dictionary being stored for each specific organization that utilizes the system to create and store an instance of a digital duplicate 301. In some implementations, however, dictionaries may be shared between domains and/or subdomains. For instance, if a first organization in the medical services industry has already established a dictionary that stores its schema data describing its digital context, then a second similar medial services organization may benefit from using this same dictionary already established for the first organization. In this way, a common set of semantics may be used across organizations in the same or similar industries.

The digital duplicate may be stored via data store 303 using any appropriate data storage technology, including by way of example, graphical databases, relational databases (SQL, Oracle), in-memory data storage, as well as other types of storage. Digital duplicate information may be stored in two or more such database technologies for redundancy and/or performance purposes.

In some implementations an index file may be used as a separation of concerns measure. For instance, an index file that may contain data keys may reside in one location and the digital duplicate data may reside in another, perhaps remote, location. In this way, a set of semantic services may be employed to store and retrieve data specific to the underlying digital duplicate data by first accessing the data keys and then using those data keys to identify and access the location of the underlying digital duplicate data.

IV. Example Organizer Operations

As mentioned above, an organizer tool (which may be embodied by a software tool running on a computing device) may be used to make a connection between the semantic network and an organization's underlying data stores and may be configured to engage in certain functionality, including linking multiple data sources to the semantic network, and/or onboarding the underlying data from the organization's data stores to an organizer data store and ultimately into the semantic network after filtering, cleaning, transforming, and/or validating the data as desired.

Example operations that may be carried out by one or more computing devices running the disclosed organizer software tool are discussed in detail below. For purposes of illustration only, these example operations are described as being carried out by a computing device, such as computing device 200 (FIG. 2), which as described above, may serve as one or more of client stations 113 (FIG. 1B) and/or back-end platform 112 (FIG. 1B). In this respect, it should be understood that, depending on the implementation, the operations discussed herein below may be carried out entirely by a single computing device, such as one or more of client stations 113 or by back-end platform 112, or may be carried out by a combination of computing devices, with some operations being carried out by back-end platform 112 (such as computational processes and data-access operations) and other operations being carried out by one or more of client stations 113 (such as display operations and operations that receive user inputs). However, other arrangements are possible as well.

To help describe some of these operations, a flow diagram may also be referenced to describe combinations of operations that may be performed by a computing device. In some cases, a block in a flow diagram may represent a module or portion of program code that includes instructions that are executable by a processor to implement specific logical functions or steps in a process. The program code may be stored on any type of computer-readable medium, such as non-transitory computer readable media (e.g., data storage 204 (FIG. 2)). In other cases, a block in a flow diagram may represent circuitry that is wired to perform specific logical functions or steps in a process. Moreover, the blocks shown in the flow diagrams may be rearranged into different orders, combined into fewer blocks, separated into additional blocks, and/or removed, based upon the particular embodiment. Flow diagrams may also be modified to include additional blocks that represent other functionality that is described expressly or implicitly elsewhere herein.

As noted above, in one aspect, the organizer software tool may engage in a "data onboarding process" by which it may cause a computing device to, among other functions, carry out a process that facilitates connecting to various data sources that house an organization's data, establishing pipelines that operate to onboard the organization's data to an organizer data store and apply filter, clean, and/or transformation operations that help map the organization's data to a semantic network established for the organization. This process may take various forms.

Figure 4:
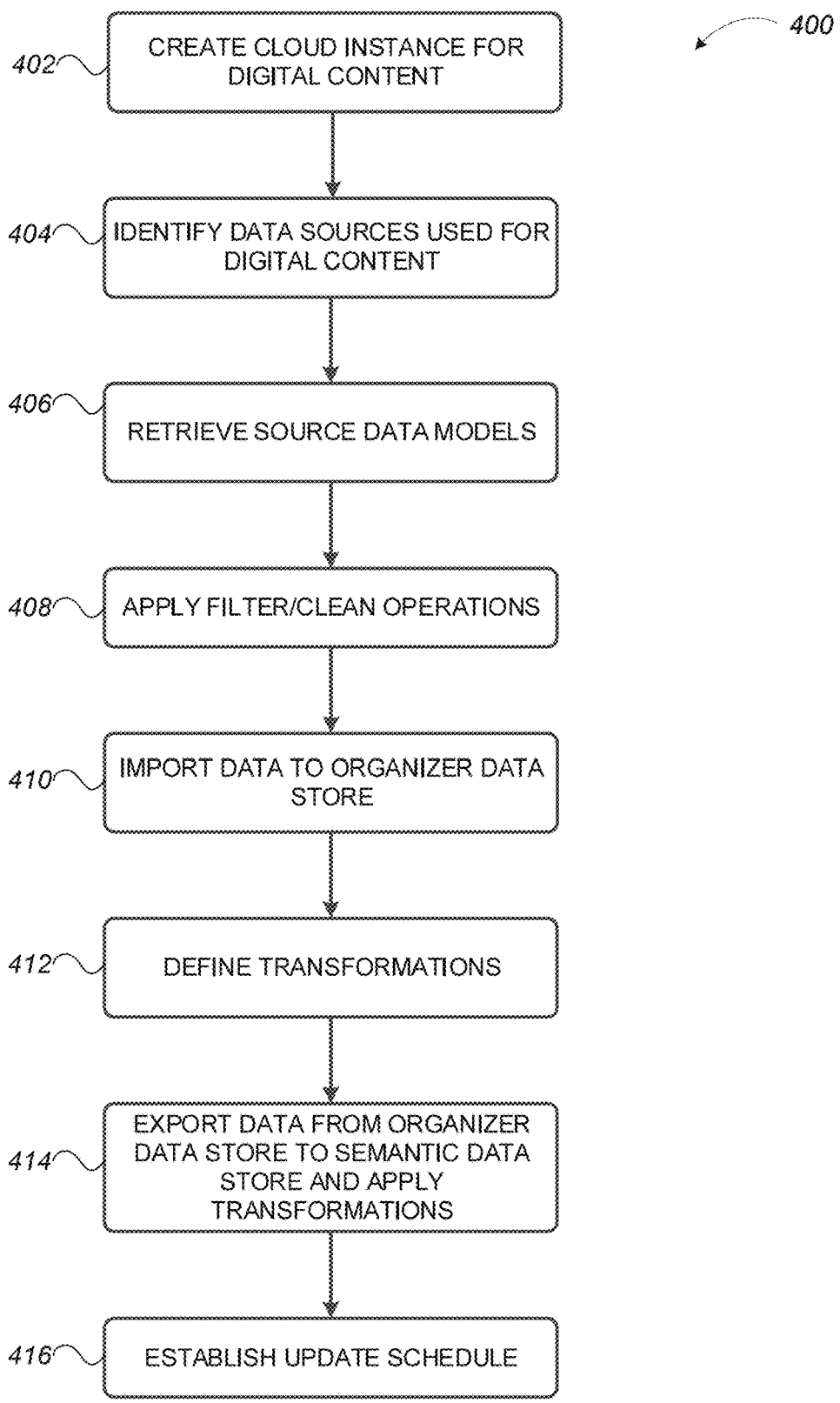
FIG. 4 is a flow diagram depicting example operations that may be carried out in accordance with one or more embodiments of the present disclosure.

With reference now to flow diagram 400 of FIG. 4, one example of a data onboarding process carried out in accordance with the disclosed organizer software tool is illustrated and described. This process may generally involve the following operations: (i) at block 402, the computing device may create a cloud instance for the digital content, (ii) at block 404, the computing device may identify and connect to the data sources used for the digital content, (iii) at block 406, the computing device may retrieve the data models (which may generally be information that identifies the column structure and general format of data stored at the data source) from the data sources and import the data models into the software tool, (iv) at block 408, the computing device may establish filter and/or clean operations to be performed on the source data, (v) at block 410, the computing device may import the source data to an organizer data store and apply the established filer and/or clean operations, (vi) at block 412, the computing device may define a set of transformations to apply to the source data, (vii) at block 414, the computing device may export the data from the organizer data store to the semantic data store and apply the defined transformations, and (viii) at block 416, the computing device may establish an update schedule by which the system will refresh the semantic data store. Each of these operations will now be discussed in further detail with reference, in some cases, to example snapshots of GUIs that may facilitate some or all of the disclosed functionality.

Turning first to block 402, the computing device may begin the data onboarding process by creating a cloud instance for the digital content. In one implementation, this may take the form of establishing a cloud network storage location wherein a particular organization's data may be stored. This may include, for instance, establishing or reserving a portion of a cloud network storage location or other data store to serve as either or both of the organizer data store 114B and/or the semantic network data store 114C (FIG. 1B). This cloud network data store may be provided either by the owner or operator of the back-end platform 112 or by a third-party provider of "on demand" cloud storage, such as Amazon Web Services (AWS), or the like. To facilitate this process, the organizer software tool may present one or more GUI screens through which a user may enter various identifying information for the organization and/or business unit or division of the organization and then use this information to establish an appropriate cloud instance for the digital content. A computing device may create a cloud instance for digital content in other ways as well.

Next at block 404, the computing device may identify the organization's various disparate data sources (represented in one example in FIG. 1B by business data sources 114A or in another example in FIG. 1A by data sources 106), which are desired to be used as sources for the digital content. The computing device may do this in various ways. As one possibility, the computing device may present a GUI through which a user may provide various user inputs that indicate how the computing device can connect to the one or more organization's various disparate data sources. For instance, for each data source desired to be connected to and used as a source for the digital content, a user may provide a user input that indicates a name for the data source (e.g., "customer database," employee list," etc.), the type of data source (e.g., Microsoft Excel workbook, SAP HANA, Microsoft Access database, Oracle database, SQLServer database, a web service, TADA database, etc.), the IP address or other location-identifying information of the data source, credentials or other security information for accessing the data contained within the data source, and/or information identifying the type or format of the data stored within the data source. A user may provide other information that facilitates the computing device connecting to an organization's disparate data sources as well.

As another possibility, the computing device may receive a file upload that comprises a data source. As an example, the computing device may receive a spreadsheet provided via computer readable media, such as a flash drive or disc. To facilitate receiving a file upload that comprises a data source, the computing device may present a GUI through which a user may provide various inputs that instruct the computing device where to retrieve the file from. The computing device may identify and connect to an organization's various disparate data sources in other ways as well. Once the computing device identifies and/or connects to a given data source, that data source may be said to be "enrolled." It should be appreciated that, in practice, multiple data sources may be "enrolled" by the disclosed software tool, each of which may ultimately provide underlying data to the platform.

Next at block 406, the computing device may then connect to the identified data sources, identify the data models used at the data sources, and import the data models into the platform. For example, for data stored in a typical relational database, the data model for that database may include information that identifies how many tables are included within the database, how many columns there are for each table, the name of each column, the data type of the records that are or will be stored within the data tables (e.g., "integer," "string," "decimal," "datetime," etc.), and/or other information that further defines the data model, such as allowable length of a data entry stored at each column, or other rules for storing data at each column such as whether leading or trailing spaces are allowed.

Figure 5:
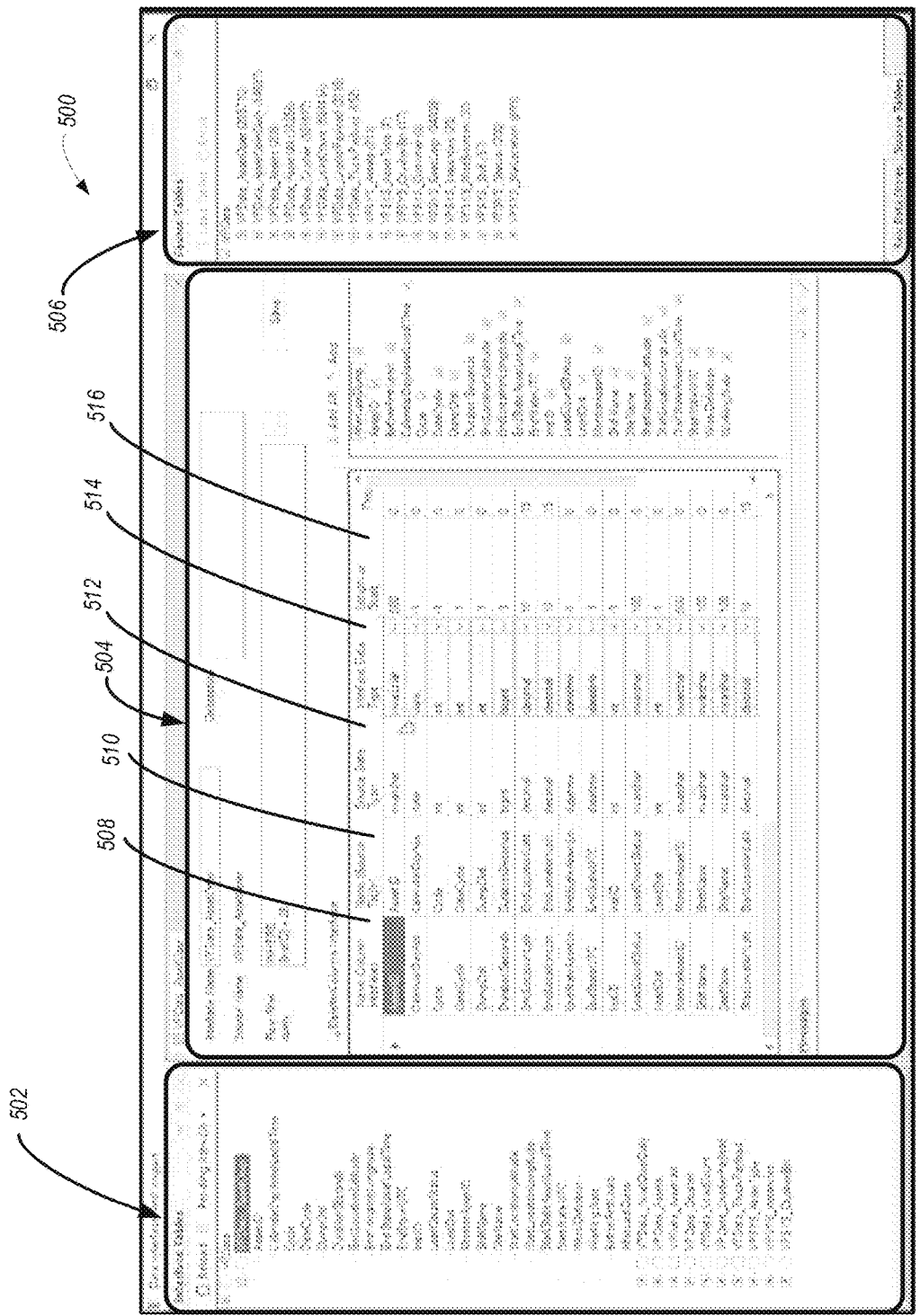
FIG. 5 is an example output produced by a device executing one embodiment of a software tool according to the present disclosure.

In some implementations, once the computing device has retrieved the data models from the one or more data sources, the computing device may present a GUI that displays a listing of the one or more data sources, the various tables available at each data source, and a navigable interface that allows a user to explore the data model of each data source. To illustrate one example of this, FIG. 5 depicts an example snapshot 500 of a GUI that displays a listing of the data sources, the various tables available at each data source, and a navigable interface that allows a user to explore the data model of each data source. As depicted, the GUI may include a "source table" graphical location 506 that may display indications of the various data sources that have been enrolled and are thus available to the computing device, including what tables are included in each data source and which columns are included within each table. As depicted in the example GUI of FIG. 5, the source table location 506 shows a "VPData" data source that includes several tables including a "VPData_AssetOper" table and a "VPData_AssetOperDaily" table, among other displayed tables. The example GUI may use a "nested tree structure" layout to arrange the source table graphical location 506 such that the tables of a given data source are nested underneath the name of the data source, and columns of each table are nested underneath each table name. Other ways to display the columns, tables, and data sources available to the computing device may be possible as well.

Returning to FIG. 4 at block 408, the computing device may next establish filter and/or clean operations to be performed on the source data prior to or in conjunction with onboarding the data. Many types of filter/clean operations are possible. For example, a filter/clean operation may specify which portions of the source data to import from the various data sources and which portions not to import. A filter/clean operation may also specify, for instance, whether to change the name or data type of any aspect of the data model during the onboard process. For instance, one example filter/clean operation may be an operation that changes the name of a column from something like "ShNm" to "Shift Name" or from "AID" to "Asset ID." Another example filter/clean operation may be an operation that changes a data type for a column from "float" to "integer" or from "string" to "nvarchar." Yet another example filter/clean operation may be an operation that changes the length of the data input from, say, "500" to, say, "20." And yet another example filter clean operation may be an operation that specifies to import only those data records that match a particular query filter, such as records that have an "InstID" value of "28." These were merely examples, however, and other types and examples of filter/clean operations may be possible in practice. One advantage of applying a filter/clean operation at this point in the process is that the data can be preconditioned to a known data type for further manipulation, independent of its original data type. Additionally, any errors in the data source can be identified during the onboarding process (e.g., if not all items in a column share the same data type, an error will be raised at this point).

To facilitate establishing filter and/or clean operations, such as the forgoing examples as well as other possible examples, the computing device may present a GUI through which a user may provide various user inputs in order to specify one or more filter/clean operations to employ. To illustrate with an example, returning to snapshot 500 of FIG. 5, the GUI depicted includes an example "filter/clean" graphical location 504 and a "table interface" graphical location 502.

Referring first to filter/clean graphical location 504, this location shows various information about the data model and any established filter/clean operations for a selected table from the data source. As depicted in FIG. 5, for instance, the example filter/clean graphical location 504 depicts various information related to the "VPData_AssetOper" source data table. As further depicted in filter/clean graphical location 504, for instance, the GUI may include a "Name (Source Table)" column 510 that shows the name of the various columns as they exist in the source data table, a "Name (Column Interface)" column 508 that shows the name of the corresponding column as it will be identified in the (new) table and column interface (i.e., when imported into the organizer data store), a "Source Data Type" column 512 that shows the data type for the column as it exists in the source data table, an "Interface Data Type" column 514 that shows the (new) data type for the corresponding column as it will exist in the table and column interface (i.e., when imported into the organizer data store), and a "Length or Scale" column 516 that shows the (new) length or scale of the data for the corresponding column as it will exist in the table and column interface (i.e., when imported into the organizer data store).

Portions of the filter/clean graphical location 504 may be configured to receive user inputs in order to establish certain filter/clean operations. For instance, in this example columns 508, 514, and 516 may be editable so as to provide the ability to change the name of columns, change the data type, and/or change the length of data, respectively, of the data tables of the data source prior to importing the data from the data source into the organizer data store. As an example, a user may enter text into the various rows of columns 508 or 516 in order to change the name of a given column of a source data table or change the length or scale of the data stored for that column. The various rows of column 514 may include drop down boxes that contain various example data types that may be selected by a user to change the data type for a given column of a source data table. The filter/clean graphical location 504 may include other columns as well so as to provide the ability to view and/or edit one or more other properties of the data model of a data source prior to importing the data from the data source into the organizer data store. In this way, a user may navigate through the various data tables of the data source via the filter/clean graphical location 504 and provide various user inputs (e.g., via columns 508, 514, and/or 516, among, perhaps, other possible columns that are not shown) to establish a set of filter/clean operations to apply to the source data as it is imported into the organizer data store.

Once a set of filter/clean operations are established for one or more data tables of a particular data source, the computing device may engage in some additional functionality. For instance, in some implementations, the computing device may determine a set of similar filter/clean operations to apply to other data tables in the same or different data source based on the set of filter/clean operations that were established above by the computing device, for instance, receiving via a GUI one or more user inputs that define a set of filter/clean operations. The computing device may do this in any of a number of different ways. As one possibility, for instance, for a set of filter/clean operations that change the name of a column from "AID" to "Asset ID," and that change a data type for this column from "decimal" to "integer," and that changes the length of the data input from "500" to "20," the computing device may first search other source data tables that have columns that are similarly named (e.g., for columns that are named "AID," "AssetID," "Asset ID" or the like) and have similar source data formats (e.g., columns that may have data formats of "decimal" and/or have length at or near "500"). Once any such columns are found in other source data tables, the computing device may apply the same filter/clean operations to these data columns, or the computing device may present to a user though a GUI a dialog box or the like recommending these filter/clean operations and prompting the user to approve the set of recommended filter/clean operations. As another possibility, the computing device may recognize an existing filter/clean operation to apply as a result of a user entering in a few characters of a particular column. For instance, for a new filter/clean operation where a user enters "Asse" into the "Name (Column Interfaces)" column 508, the computing device may suggest an existing set of filter/clean operations where at least the phrase "Asse" appears, such as a set of filter/clean operations that change the name of a column from "AID" to "Asset ID," and that change a data type for this column from "decimal" to "integer," and that changes the length of the data input from "500" to "20."

In some implementations, the computing device may generate what is referred to as a "table interface" having one or more "column interfaces." The computing device may generate one table interface for every source data table that will be onboarded into the system and stored in the organizer data store. Likewise, for every column in a particular source data table that will be onboarded into the system and stored in the organizer data store, the computing device may generate a corresponding column interface. These column interfaces and table interfaces are generally data structures that define or contain, among other things, (i) information regarding where in the source data stores to get the data that forms the particular column or table interface, and (ii) the set of zero or more filter/clean operations that may be applied to the source data as it is imported into the organizer data store. In this way, a set of all table interfaces for a particular organization can be thought of together as a "data interface," which serves as the input for the rest of the data operations carried out (or facilitated) by the disclosed organizer software tool.

In some embodiments, the computing device may present a GUI or portion of a GUI that displays the list of table and column interfaces for a given project. Returning to the example GUI of FIG. 5, as mentioned this GUI may include a table interface graphical location 502, which displays the list of table interfaces and column interfaces in a nested format. Each table interface may be selectable such that when a given table interface is selected, the computing device may display in filter/clean graphical location 504 a corresponding set of information regarding the data model and any selected filter/clean operations for the corresponding table from the source database.

Generating a data interface, which comprises table interfaces and column interfaces as referred to above, may provide several advantages. For instance, as mentioned, the data interface can be thought of as serving as the input for the remainder of the data operations carried out (or facilitated) by the organizer software tool. In this way, the remainder of the data operations will not depend on the underlying data source directly but rather will be "shielded" by the data interface. In this way, if the organization makes a change to some part of the underlying source data (such as changing a column name or a column's data type), this change may not corrupt the rest of the downstream operations of carried out (or facilitated by) the organizer software tool, as those operations refer to and thus utilize the table and column interfaces rather than the source data directly.

Returning to FIG. 4 at block 410, the computing device may next import the underlying source data records to an organizer data store (e.g., organizer data store 114B) and apply the filter/clean operations that were established in accordance with the previous block 408. For instance, in one embodiment, as the data is being imported into the organizer data store, the computing device may apply the filter/clean operations and store the data in the organizer data store after applying the set of established filter/clean operations.

In an alternative embodiment, the computing device may not import the underlying source data records to an organizer data store before applying the filter/clean operations. Rather, the computing device may apply the filter/clean operations to the data as it is stored in the underlying data source. As a result, the computing device may determine if there are any exceptions or errors that result from these operations and, if there are, present these exceptions or errors to a user for resolution. The set of filter/clean operations can be stored in a data store, such as organizer data store 114B.

Moving on to block 412, the computing device may next define a set of transformations to apply to the source data stored in the organizer data store. As a general matter, a transformation may be any change, manipulation, or combination of data, and/or assignment of the data to an aspect of the semantic data network, such as a node or a link in a digital context. Transformations can be thought of as operations that re-shape the input data and form the basis of pipelines that in turn can be thought of as moving data into the semantic network. More specific examples of transformations may include, for instance, removing duplicates, converting data types, removing certain characters from data, concatenating columns, extracting dates, filtering rows, aggregating rows, merging tables, creating a new virtual table or data source, and/or assigning data to an aspect of the semantic network, such as a node or link in the semantic network, among other possibilities. Transformations may be applied to the data stored in the organizer data store in various ways. As one possibility, transformations may be applied to data from a single data table from a single data source. As another possibility, transformations may be applied to data from multiple data tables from multiple data sources. A set of transformations established for a particular data table may be referred to as a "sequence" and a set of sequences for all the tables in a particular data source may be referred to as a "data contract."

Figure 6:
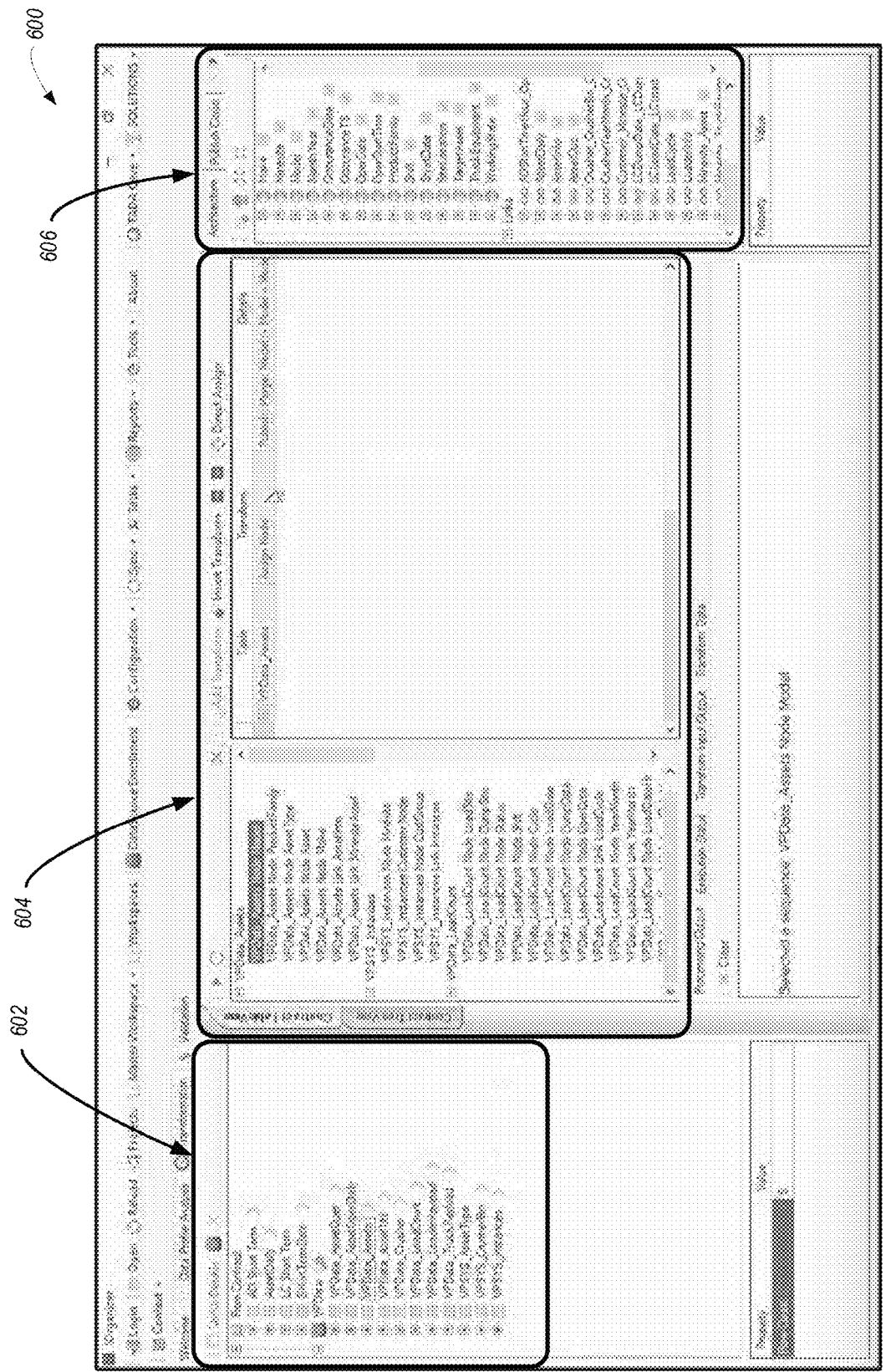
FIG. 6 is an example output produced by a device executing one embodiment of a software tool according to the present disclosure.

To facilitate establishing transformations to apply to the source data stored in the organizer data store, the computing device may present a GUI through which a user may provide various user inputs in order to select or otherwise define the set of transformations to apply for a particular data table or data source. To illustrate with an example, FIG. 6 is an example snapshot 600 of a GUI that displays a "data source" graphical location 602 that is configured to display data tables and data sources that have been imported into the organizer data store (or created via a transformation, as will be described herein), a "data contract" graphical location 604 that is configured to display the set of transformations for each data table of the data sources that have been imported into the organizer data store, and a "node/link" graphical location 606 that is configured to display the nodes, links, and/or properties of the semantic network.

Within the data contract graphical location 604, for instance, the computing device may display the set of transformations that have been established for a particular data table. As depicted in FIG. 6, for instance, the data contract graphical location 604 depicts indications that transformations that have been established for the "VPData_Assets," "VPSYS_Instances," and "VPData_Load-Count" data tables. In some embodiments, the computing device may provide the ability to select indications of the transformations (e.g., "VPData_Assets_Node_Model") and responsively display further details on the transformation as well as provide an area within which a user can modify the transformations or add new transformation. For instance, upon the selection of an "Add Transform" button or the like, the computing device may provide a listing of possible transformations to select from to apply to some or all the data in a particular data table. As depicted in FIG. 6, for instance, an "Assign Node" transform has been established for the "Model" column in data table "VPData_Assets" from data source "VPData." The data from the "Model" column has been assigned to the "Model" node in the semantic network.

As mentioned, one type of transformation for a data table may result in some or all of the data table being resolved into a new, "virtual" data source referred to in some examples as a "from contract" data source. A virtual data source may then be treated as if it were a traditional data source connected to by the computing device, in that additional transformations may be applied to data tables and columns of the virtual data source, such as assigning data columns to nodes, links, and properties of the semantic network. As depicted in FIG. 6, for instance, the data source graphical location 602 depicts a "From Contract" virtual data source having several virtual data tables, including "AO Short Term," "AssetDaily," "LC Short Term," and "Short TermDate," although in practice others are possible.

It may be advantageous to apply a transformation to one or more data tables of a data source to form a virtual data source in instances where it has been identified that a particular kind of data would be desirable, but the organization does not store that type of data. For instance, an organization may store data in a first data table related to customer information, such as the customer name and customer address, and may store data in a second data table related to purchases made by customers, such as date of purchase, products purchased, quantity purchased, etc. The organization may not necessarily, however, store roll-up data that aggregates purchase information and customer information. It may be advantageous to establish such roll-up data in a virtual data source, in order to help prevent the number of transformations applied to a given data table from becoming unwieldy, help an operator or other subject matter expert visualize the data, help assist an operator in applying additional transformations, such as assigning the roll-up data to a node, link, or property in a semantic network, among other possible advantages. As an example, by establishing an appropriate set of transformations, a user may enroll a virtual data source that includes, say, a first table that aggregates by month all the purchases made from customers who are located in midwestern states, east-coast states, southern states, etc., and, say, a second table that aggregates by product all the purchases made by customers on a more granular geographic level, such as by state or even city. Of course, this is merely an example; in practice there may be many other types of virtual data sources that can be established as well as many other reasons for establishing a virtual data source.

As transformations are established for the various data tables of the enrolled data sources, the computing device may engage in some additional functionality. For instance, based on a first set of transformations applied to a first set of data, the computing device may identify a second set of data with names or other properties similar to names or other properties of the first set of data and the computing device may establish a second set of transforms for the second set of data that are similar to the first set of transforms. To illustrate with an example, one table of one data source may contain data related to an organization's customers. This data table may include columns such as "CustomerID," "CustomerName," "CustomerAddress," "CustomerCity," "CustomerState," "CustomerCountry," etc. A second table of a second data source may also contain data related to the organization's customers and include such columns as "CustID," "CustName," "CustPaymentTerms," etc. In this example, if the computing device establishes a transformation (e.g., through a user providing a suitable user input via a GUI) whereby the column "CustomerID" from the first table of the first data source is assigned to the "customer" property of the "customer" node in the semantic database, then the computing device may use that transformation as a basis to establish similar transformations. For instance, the computing device may recognize that the other columns in the same data table also contain the same word "Customer" as the first column and may thus use this as a basis to establish transformations for these columns that assign these columns to various other properties in the "customer" node.

Similarly, the computing device may recognize that the second table of the second data source also contains columns each with the prefix "Cust" in them (which the computing device may determine is similar to "Customer") and each column contains similar suffixes to the columns of the first data table in the first data source (e.g., "ID" and "Name"). The computing device may thus use this as a basis to also establish transformations for these columns that are similar to the transformations established for the first data table in the first data source (i.e., assign these columns to various other properties in the "customer" node).

The computing device may also take into account other factors in determining whether to establish certain transformations for a particular set of data. For instance, in one embodiment, when determining whether to establish or suggest transformations for a first set of data columns, the computing device may compare the underlying data records for the first set of data columns to underlying data records for another set of data columns (e.g., from the same or different data source) to determine whether the records contain a threshold number of similar entries. If the computing device determines that the underlying data records contain such a threshold number of similar entries, then the computing device may use this as a basis for applying the same transformations to the first set of data columns that have been established for the other set of data columns. In some embodiments, the computing device may not automatically establish transformations but rather present suggested transformation to apply and, through a GUI, present a user with the option to adopt some or all of the suggested transformations. The computing device may establish or suggest transformations in other ways and may also engage in other functionality as well.

In addition to establishing transformations, the computing device may also determine whether discrepancies exist in an organization's data and may responsively highlight these discrepancies and present an option or a suggestion to address the determined discrepancy. For instance, if one data table contains a first column name "CustomerName" with a data record of "AjaxPlumbing" and a second column name "Customer ID" with a corresponding data record of "255", and another data table contains a first column name "CustName" with a data record of "AjaxP" and a second column name "CustID" with a corresponding data record of "255," the computing device may determine that the columns "Customer ID" and "CustID" are sufficiently similar in name such that they refer to the same semantic concept. Thus, the computing device may recognize that data records for each column contain a similar entry (namely, "255") and may thus determine that the data corresponding to the other columns, namely "CustName" and "CustomerName" likely refer to the same entity. However, the computing device may also determine that underlying data records corresponding to the Customer ID "255" for each data table (namely, "AjaxP" and "AjaxPlumbing") are not sufficiently similar. Responsively, the computing device may indicate this discrepancy to a user, such as by presenting the discrepancy via a GUI. The computing device may also present the user with the option to address this discrepancy by, for instance, adopting one version of the customer name over the other. For instance, the computing device may provide the user with the option to select one of the versions of the customer name, and upon receiving a user input selecting one of the customer names, the computing device may establish a transformation that operates to apply the selected customer name in place of the non-selected customer name. The computing device may address data discrepancies in other ways as well.

Figure 7:
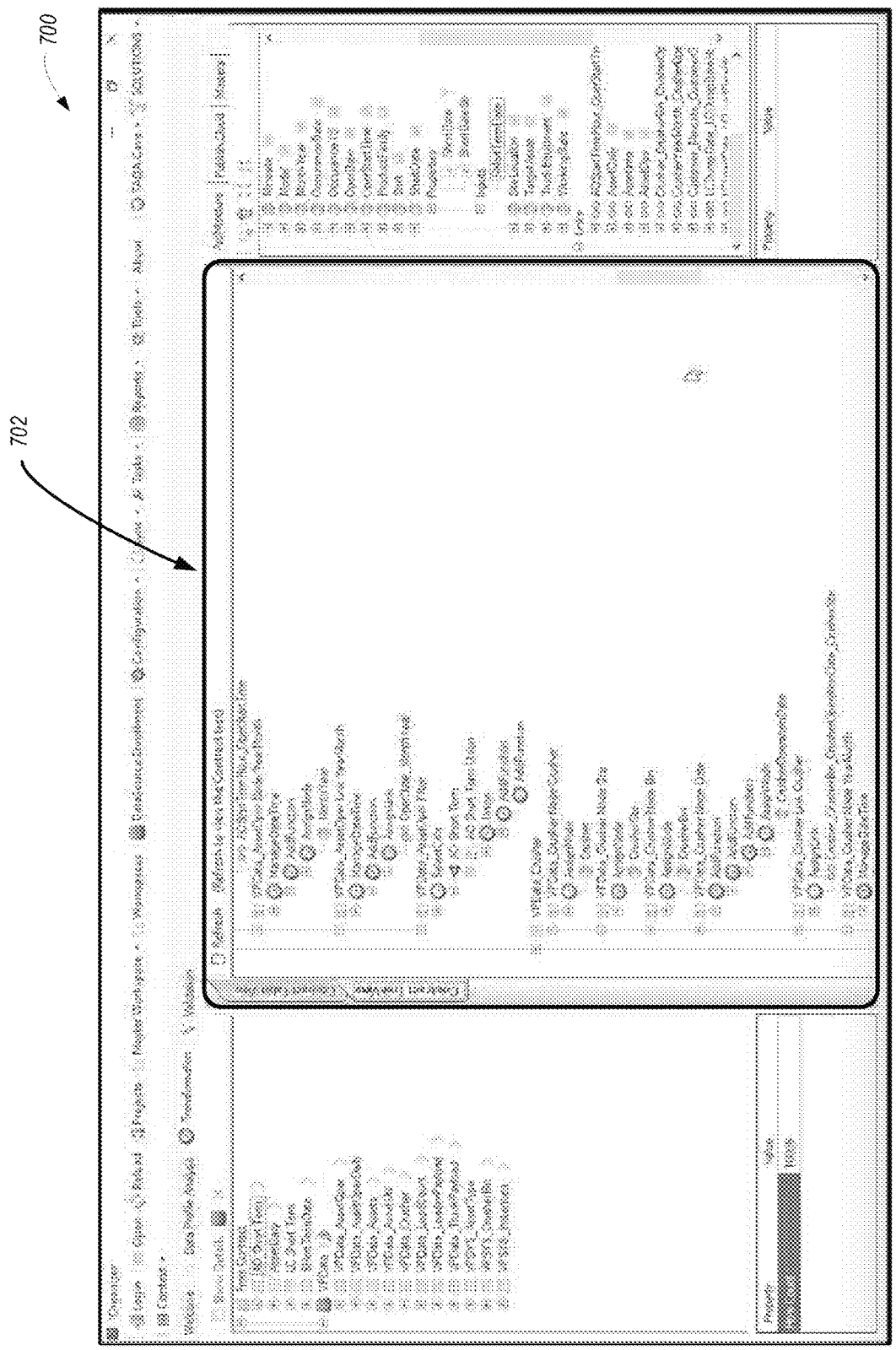
FIG. 7 is an example output produced by a device executing one embodiment of a software tool according to the present disclosure.

As mentioned, a set of transformations established for a particular data table may be referred to as a "sequence" and a set of sequences for all the tables in a particular data source may be referred to as a "data contract." In some embodiments, the computing device may in one or more ways present visualizations of the various data contacts established for a given organization. One example visualization may take the form of a data contract tree view, which is depicted by the example snapshot 700 in FIG. 7. As depicted in location 702, for instance, the computing device may present the various transformations that have been established for each source data table in a nested tree format. This nested tree format may, among other things, indicate for each data table, the name and type of transformation established and may further indicate any additional details about each established transformation, such as the node, link, or property of the semantic network the data is assigned to. Other ways to present visualizations of the various data contacts established for a given organization may be possible as well.

Returning to FIG. 4 at block 414, the computing device may next apply the established transformations to the source data stored in the organizer data store and then export the transformed data and store it in a semantic data store (e.g., sematic data store 114C). This action can be thought of as pairing the organization's data with the digital context. As such, once the data has been transformed and stored in the semantic data store, it combines with the digital context to form an instance of a digital duplicate. In one embodiment, as the data is stored in the semantic data store, the computing device may assign to each instance of the data a unique identifier that identifies the location within the semantic data store at which each data instance is located. For instance, this unique identifier may take the form of a unique URL or an identifier of a location within a SQL or NoSQL table, among other possibilities. In some embodiments, the transformations are not yet applied to the source data but, rather, data describing the transformations are stored in a data store, such as organizer data store 114B, and later applied to the source data as it is onboarded into the platform from the underlying data sources 114A during a batch update, or the like.

Next at block 416, the computing device may establish an update schedule by which the computing device system will refresh the data stores. An organization's data may change over time. For instance, an organization may delete data records, reformat data models, and/or add new data sources altogether. To account for this, the disclosed organizer software tool may provide the ability to schedule updates to the various data stores, whereby the computing device periodically engages in some or all of the forgoing functionality according to an established schedule. For instance, the computing device may periodically engage in applying filter/clean operations and importing source data into the organizer data store as well as engage in applying transformations to data stored in the organizer data store and exporting the transformed data from the organizer data store to the semantic data store. One advantage to establishing an update schedule is that even when new underlying data sources are enrolled or have modified filter/clean operations or transformations established, the update can happen seamlessly without a user having to rebuild any filter/clean operations or transformations.

In some embodiments for instance, the computing device may apply a periodic update schedule on a per-data-source basis. For instance, if an organization updates data (e.g., purchasing data) in a first data source on an hourly basis, but updates data (e.g., customer data) in a second data source on a daily (or an even less-frequent basis) basis, the computing device may take advantage of this knowledge to engage in update actions that involve the first data source more frequently (e.g., hourly) than it may engage in update actions that involve the second data source (e.g., which may occur daily or weekly, as examples). To facilitate this, the computing device may present a GUI or a set of GUIs through which a user may provide various user inputs that the computing device may use to establish one or more update schedules for an organization's data. Other ways of establishing an update schedule by which the computing device system will refresh the data stores are possible as well.

In some embodiments, the computing device may establish a trigger event, upon the occurrence of which the computing device will refresh the data stores. Many different types of trigger events are possible. For instance, one type of trigger event may take the form of an underlying data source being updated. When an underlying data source is updated with new data or data in the underlying data source has changed in some way, the computing device may receive an indication of such and may responsively engage in refresh actions, such as applying filter/clean operations and importing source data into the organizer data store as well as applying transformations to data stored in the organizer data store and exporting the transformed data from the organizer data store to the semantic data store. as one possibility. Other types of trigger events may be possible as well.

In some embodiments, the computing device may cause the system to store multiple instances of an organization's data in the various data stores. In this way, should some change to the underlying data sources corrupt the organization's data as stored in either or both of the organizer data store or the semantic network data store, the computing device may revert back to using a previous (uncorrupted) version of the organization's data.

One way that the computing device may engage in updates to the various data stores is to selectively update just the data that has changed in the underlying data source. To facilitate this, the computing device may retain a timestamp or other mechanism that indicates the most recent time the computing device imported data into the organizer data store and compare that against a timestamp or other mechanism retrieved from the underlying data store that indicates when a data column or data table in the underlying data store was last updated. When the timestamp or other mechanism from the underlying data store indicates that a set of data was updated more recently than the computing device imported such data into the organizer data store, then the computing device may carry out an update process for just that set of data that was updated in the underlying data store more recently. Mechanisms other than a timestamp may be used to facilitate the computing device determining whether some set of data from the underlying data source has been updated more recently than was imported into the organizer data store, such as editable revision fields in the data source, update counters, or even data fields that contain a flag or other indication such as a text entry "finished," or the like, that indicate when an update has been completed.

In some embodiments, the computing device may engage in data validation functions. For instance, as mentioned, an architect tool may be used to establish the framework by which an organization's data is set out in the semantic network (i.e., the digital context). In some cases, an operator may use the architect tool to define some portion of the digital context, switch to use the organizer tool to onboard some portion of the organization's underlying data, including establishing filter/clean operations and/or transformations, and then switch back to the architect tool to continue modifying or adding new aspects to the digital context. To address situations like this, the organizer tool may engage in a validation procedure by which it identifies any changes to the structure of the semantic network (such as the presence or absence of nodes, links, or properties) that affect or are related to established transformations. For instance, if a transformation were established that operated to assign a particular data column to a particular property of a particular node in the semantic network, and thereafter a change occurred to the semantic network such that the particular property and/or the particular node were removed or otherwise changed in the semantic network, then the computing device may provide to a user an indication of this change. In some embodiments, the computing device may present though a GUI an indication of the specifically affected transformation and may provide one or more recommendations on how to address the change (such as by revising the transformation to assign the data column to some other property of some other node, among other possibilities). Other ways to engage in data validation functions may be possible as well.

In some embodiments, the computing device may engage in a lineage feature, by which the computing device may use the list of transformations in a data contact to determine the data table and column(s) that feed each aspect of the semantic network, such as the nodes, properties, and links. The computing device may provide one or more visualization tools that show the "data lineage" between an aspect of the semantic network and one or more underlying data sources. In this way, a user can trace the lineage of an aspect of the semantic network back to an underlying data source and identifying transformations to that data along the way so as to get a better understanding of how the underlying data is sued to populate the semantic network. This lineage feature may be especially valuable in situations where many different transformations are applied to the underlying source data before it is mapped to aspects of the semantic network.

V. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:
a network interface;
at least one processor;
a non-transitory computer-readable medium; and
program instructions stored on the non-transitory computer-readable medium that are executable by the at least one processor to cause the computing system to perform functions including:
retrieving a data model for a data source, wherein the data model is associated with at least a plurality of data tables of the data source;
causing a client station to present a graphical user interface (GUI) via which user input is received; and
for each data table of the plurality of data tables:
establishing, based at least in part on first user input received via the GUI, at least one filter operation or at least one clean operation to be applied to data of the data table;
generating, based at least in part on second user input received via the GUI, a table interface associated with the data table, the table interface being a data structure that comprises (i) information regarding where in the data source to retrieve data of the data table and (ii) the established at least one filter operation or at least one clean operation to be applied to the data of the data table;
onboarding underlying data from the data source using the generated table interface, so as to apply the established at least one filter operation or at least one clean operation;
defining at least one transformation operation to apply to a portion of the underlying data from the data source that has been onboarded using the generated table interface; and
applying the at least one transformation operation to the portion of the underlying data onboarded using the generated table interface to thereby assign the data to a semantic network, the semantic network comprising conceptual data components and associative data components.

2. The computing system of claim 1, wherein the program instructions are further executable to cause the computing system to perform functions including:
receiving instructions that facilitate connecting to the data source;
responsive to receiving the instructions, connecting to the data source;
retrieving from the data source the data model.

3. The computing system of claim 1, wherein the program instructions are further executable to cause the computing system to perform functions including:
retrieving a second data model for a second data source;
establishing at least one second filter operation or at least one second clean operation that modifies an aspect of the retrieved second data model;
onboarding underlying data from the second data source while applying the established at least one second filter operation or at least one second clean operation;
define at least one second transformation operation to apply to a portion of the underlying data from the second data source that has been onboarded; and
applying the at least one second transformation operation to the portion of the underlying data from the second data source to thereby assign the data to the semantic network.

4. The computing system of claim 1, wherein defining at least one transformation operation to apply to a portion of the underlying data from the data source that has been onboarded using the generated table interface comprises defining a transformation operation that includes assigning the portion of underlying data to at least one of the conceptual data components and the associative data components of the semantic network.

5. The computing system of claim 1, wherein the program instructions are further executable to cause the computing system to perform functions including:

establishing a schedule by which, or a trigger event responsive to which, the computing system refreshes the semantic network; and periodically repeating in accordance with the established schedule the steps of (i) onboarding underlying data from the data source using the generated table interface, so as to apply the established at least one filter operation or at least one clean operation and (ii) applying the at least one transformation operation to the portion of the underlying data onboarded using the generated table interface to thereby assign the data to the semantic network.

6. The computing system of claim 1,
wherein onboarding underlying data from the data source using the generated table interface, so as to apply the established at least one filter operation or at least one clean operation comprises (i) extracting the underlying data from the data source, (ii) applying the at least one filter operation or the at least one clean operation, and (iii) storing the underlying data, having applied thereto the at least one filter operation or the at least one clean operation, in a first platform data source.

7. The computing system of claim 6,
wherein applying the at least one transformation operation to the portion of the underlying data onboarded using the generated table interface to thereby assign the data to a semantic network comprises (i) exporting the underlying data from the first platform data source, (ii) applying the at least one transformation operation to the exported data, and (iii) storing the underlying data, having applied thereto the at least one filter operation or the at least one clean operation and then the at least one transformation operation, in a second platform data source.

8. The computing system of claim 1, wherein for each data table of the plurality of data tables, establishing, based at least in part on user input received via the GUI, at least one filter operation or at least one clean operation comprises:
establishing at least one filter operation or at least one clean operation for a first data table; and
establishing at least one filter operation or at least one clean operation for a second data table, wherein the least one filter operation or at least one clean operation for the second data table is established based on the at least one filter operation or at least one clean operation for the first data table.

9. A method comprising:
retrieving a data model for a data source, wherein the data model is associated with at least a plurality of data tables of the data source;
causing a client station to present a graphical user interface (GUI) via which user input is received; and
for each data table of the plurality of data tables:
establishing, based at least in part on first user input received via the GUI, at least one filter operation or at least one clean operation to be applied to data of the data table;
generating, based at least in part on second user input received via the GUI, a table interface associated with the data table, the table interface being a data structure that comprises (i) information regarding where in the data source to retrieve data of the data table and (ii) the established at least one filter operation or at least one clean operation to be applied to the data of the data table;
onboarding underlying data from the data source using the generated table interface, so as to apply the established at least one filter operation or at least one clean operation;
defining at least one transformation operation to apply to a portion of the underlying data from the data source that has been onboarded using the generated table interface; and
applying the at least one transformation operation to the portion of the underlying data onboarded using the generated table interface to thereby assign the data to a semantic network, the semantic network comprising conceptual data components and associative data components.

10. The method of claim 9, further comprising:
receiving instructions that facilitate connecting to the data source;
responsive to receiving the instructions, connecting to the data source; and
retrieving from the data source the data model.

11. The method of claim 9, further comprising:
retrieving a second data model for a second data source;
establishing at least one second filter operation or at least one second clean operation that modifies an aspect of the retrieved second data model;
onboarding underlying data from the second data source while applying the established at least one second filter operation or at least one second clean operation;
define at least one second transformation operation to apply to a portion of the underlying data from the second data source that has been onboarded; and
applying the at least one second transformation operation to the portion of the underlying data from the second data source to thereby assign the data to the semantic network.

12. The method of claim 9, wherein defining at least one transformation operation to apply to a portion of the underlying data from the data source that has been onboarded using the generated table interface comprises defining a transformation operation that includes assigning the portion of underlying data to at least one of the conceptual data components and the associative data components of the semantic network.

13. The method of claim 9, further comprising:
establishing a schedule by which, or a trigger event responsive to which, the computing system refreshes the semantic network; and
periodically repeating in accordance with the established schedule the steps of (i) onboarding underlying data from the data source using the generated table interface, so as to apply the established at least one filter operation or at least one clean operation and (ii) applying the at least one transformation operation to the portion of the underlying data onboarded using the generated table interface to thereby assign the data to the semantic network.

14. The computing system of claim 9,
wherein onboarding underlying data from the data source using the generated table interface, so as to apply the established at least one filter operation or at least one clean operation comprises (i) extracting the underlying data from the data source, (ii) applying the at least one filter operation or the at least one clean operation, and (iii) storing the underlying data, having applied thereto the at least one filter operation or the at least one clean operation, in a first platform data source.

15. The method of claim 14,
wherein applying the at least one transformation operation to the portion of the underlying data onboarded using the generated table interface to thereby assign the data to a semantic network comprises (i) exporting the underlying data from the first platform data source, (ii) applying the at least one transformation operation to the exported data, and (iii) storing the underlying data, having applied thereto the at least one filter operation or the at least one clean operation and then the at least one transformation operation, in a second platform data source.

16. A non-transitory computer-readable storage medium having program instructions stored thereon that are executable to cause a computing system to:
retrieve a data model for a data source, wherein the data model is associated with at least a plurality of data tables of the data source;
cause a client station to present a graphical user interface (GUI) via which user input is received; and
for each data table of the plurality of data tables:
establish, based at least in part on first user input received via the GUI, at least one filter operation or at least one clean operation to be applied to data of the data table;
generate, based at least in part on second user input received via the GUI, a table interface associated with the data table, the table interface being a data structure that comprises (i) information regarding where in the data source to retrieve data of the data table and (ii) the established at least one filter operation or at least one clean operation to be applied to the data of the data table;
onboard underlying data from the data source using the generated table interface, so as to apply the established at least one filter operation or at least one clean operation;
define at least one transformation operation to apply to a portion of the underlying data from the data source that has been onboarded using the generated table interface; and
apply the at least one transformation operation to the portion of the underlying data onboarded using the generated table interface to thereby assign the data to a semantic network, the semantic network comprising conceptual data components and associative data components.

17. The computer-readable storage medium of claim 16, wherein the program instructions are further executable to cause the computing system to:
retrieve a second data model for a second data source;
establish at least one second filter operation or at least one second clean operation that modifies an aspect of the retrieved second data model;
onboard underlying data from the second data source while applying the established at least one second filter operation or at least one second clean operation;
define at least one second transformation operation to apply to a portion of the underlying data from the second data source that has been onboarded; and
apply the at least one second transformation operation to the portion of the underlying data from the second data source to thereby assign the data to the semantic network.

18. The computer-readable storage medium of claim 16, wherein defining at least one transformation operation to apply to a portion of the underlying data from the data source that has been onboarded using the generated table interface comprises defining a transformation operation that includes assigning the portion of underlying data to at least one of the conceptual data components and the associative data components of the semantic network.

19. The computer-readable storage medium of claim 16, wherein the program instructions are further executable to cause the computing system to:
establish a schedule by which, or a trigger event responsive to which, the computing system refreshes the semantic network; and
periodically repeat in accordance with the established schedule the steps of (i) onboarding underlying data from the data source using the generated table interface, so as to apply the established at least one filter operation or at least one clean operation and (ii) applying the at least one transformation operation to the portion of the underlying data onboarded using the generated table interface to thereby assign the data to the semantic network.

20. The computer-readable storage medium of claim 16, wherein onboarding underlying data from the data source using the generated table interface, so as to apply the established at least one filter operation or at least one clean operation comprises (i) extracting the underlying data from the data source, (ii) applying the at least one filter operation or the at least one clean operation, and (iii) storing the underlying data, having applied thereto the at least one filter operation or the at least one clean operation, in a first platform data source.

* * * * *